(12) United States Patent
Yamakado et al.

(10) Patent No.: US 8,008,791 B2
(45) Date of Patent: Aug. 30, 2011

(54) RIGHT-AND-LEFT-WHEEL DIFFERENTIAL TORQUE GENERATOR OF VEHICLE

(75) Inventors: Makoto Yamakado, Hitachinaka (JP);
Atsushi Yokoyama, Hitachinaka (JP);
Masaru Yamasaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 546 days.

(21) Appl. No.: 12/278,510

(22) PCT Filed: Feb. 8, 2006

(86) PCT No.: PCT/JP2006/302571
§ 371 (c)(1),
(2), (4) Date: Aug. 6, 2008

(87) PCT Pub. No.: WO2007/091334
PCT Pub. Date: Aug. 16, 2007

(65) Prior Publication Data
US 2009/0054202 A1    Feb. 26, 2009

(51) Int. Cl.
*B62D 5/06* (2006.01)
*B60K 17/356* (2006.01)
(52) U.S. Cl. .................. 290/4 C; 180/422; 180/242
(58) Field of Classification Search .................. 290/1 R, 290/7, 4 R, 4 C, 40 C, 45; 180/422, 242
See application file for complete search history.

(56) References Cited

U.S. PATENT DOCUMENTS

| | | | | |
|---|---|---|---|---|
| 4,354,144 A * | 10/1982 | McCarthy | ........................ | 318/13 |
| 5,056,487 A * | 10/1991 | Yamakado et al. | ........... | 123/436 |
| 6,434,469 B1 * | 8/2002 | Shimizu et al. | ................. | 701/84 |
| 6,953,415 B2 * | 10/2005 | Kadota | .............................. | 477/5 |
| 7,140,460 B2 * | 11/2006 | Shimizu et al. | .......... | 180/65.225 |
| 7,151,355 B2 * | 12/2006 | Izumi et al. | .................... | 318/801 |
| 7,235,897 B2 * | 6/2007 | Yokoyama et al. | ............. | 307/9.1 |
| 7,317,295 B2 * | 1/2008 | Izumi et al. | .................... | 318/801 |
| 7,451,850 B2 * | 11/2008 | Tokunou | ....................... | 180/242 |

(Continued)

FOREIGN PATENT DOCUMENTS

DE    10 2004 022 892 A1    12/2005

(Continued)

OTHER PUBLICATIONS

Atsuo Kawamura et al., "ADTR-Motor Drive for Electric Vehicle", The Transactions of the Institute of Electrical Engineers of Japan D, vol. 115, Edition No. 1, pp. 31-38, 1995.

(Continued)

*Primary Examiner* — Nicholas Ponomarenko
(74) *Attorney, Agent, or Firm* — Crowell & Moring LLP

(57) ABSTRACT

A right-and-left-wheel differential torque generator makes a deceleration acted on a vehicle body to be corrected in small even when a rotating electric machine for generating a right-and-left-wheel differential torque is operated to generate a yaw moment of the vehicle, for this purpose, a correcting throttle opening is added to a throttle operation by a driver to correct a torque amount of an engine brake causing a power supply, two power generators A, B coupled independently to each of the left and right wheels and a rotating electric machine C for generating a torsional torque are provided, the power generator A absorbs (brake) the torque from one wheel to generate a power, and this power is supplied so that a torsional torque is generated by the rotating electric machine C in a direction toward which the other wheel (coupled with the power generator B) is accelerated.

14 Claims, 14 Drawing Sheets

U.S. PATENT DOCUMENTS

| | | |
|---|---|---|
| 7,584,816 B2 * | 9/2009 | Miyajima et al. ............. 180/422 |
| 7,725,251 B2 | 5/2010 | Steimel |
| 2002/0147532 A1 | 10/2002 | Inagaki et al. |
| 2005/0211489 A1 | 9/2005 | Kowatari et al. |

FOREIGN PATENT DOCUMENTS

| | | |
|---|---|---|
| FR | 2 857 631 A1 | 1/2005 |
| JP | 6-344802 A | 12/1994 |
| JP | 11-30293 A | 2/1999 |
| JP | 11-91383 A | 4/1999 |
| JP | 3510033 B2 | 1/2004 |
| JP | 2004-322793 A | 11/2004 |
| JP | 2004-350463 A | 12/2004 |

OTHER PUBLICATIONS

International Search Report dated Mar. 20, 2006 (one (1) page).

* cited by examiner

RIGHT-AND-LEFT-WHEEL DIFFERENTIAL TORQUE GENERATOR OF VEHICLE

TECHNICAL FIELD

The present invention relates to an apparatus constitution and control method for controlling a vehicle motion by generating a right-and-left-wheel differential torque on a vehicle.

BACKGROUND ART

Assuming that a vehicle is a rigid body and is situated on a plane movement, the vehicle can be explained by a translation motion and rotational motion. Forces relative to each of the motions are mainly frictional forces acted between a road surface and tires. There have been proposed various types of vehicle motion controls to generate a difference of braking and driving forces among four wheels (right-and-left-wheel differential torque) of four wheels and to control directly a yaw moment, in addition to the vehicle motion control using a lateral force of the tires to be used for vehicle etc., the front-and-rear-wheel steering vehicle.

As is feasible to the above mentioned proposal, there is a right-and-left-wheel differential torque generator having the following functions such that:

1. A brake force is distributed,
2. An engine driving torque is distributed to the right and left, and
3. A rotating electric machine is used.

The items 1 and 2 are close to part of the same advantages of the present invention. However, the item 1 is used for a mechanical brake apparatus to act on a vehicle in a decelerating direction alone. The item 2 is used for distributing the engine driving torque, and is affected considerably by an acceleration operation by a driver. For this reason, the foregoing technique is different in that the invention uses the rotating electric machine to attempt to generate the right-and-left-wheel differential torque at an arbitrary timing, so that it is clearly departed from the invention. Therefore, the technique with use of the rotating electric machine as indicated in the item 3 will be described as a background art.

There have been disclosed the rotating electric machine of the item 3 used in JP-A-11-30293, JP-A-11-91383 and JP-A-2004-322793.

The JP-A-11-30293 discloses a yaw moment controller of a vehicle characterized by: a pair of electric motors incorporated into left and right wheels to be able to drive independently for each of the left and right wheels; a battery connected to the electric motors; driving condition detecting means that detects a driving condition of the vehicle; moment calculation means that calculates a target yaw moment of the vehicle in response to the detected driving condition; torque calculation means that calculates respectively left-right-wheel torques to obtain the target yaw moment in accordance with the calculated target yaw moment; and a motor control circuit connected between the battery and the pair of electric motors to control respectively the pair of electric motors in response to the respective calculated torques. An object of the invention is to provide a yaw moment controller of the vehicle to control the yaw moment of the vehicle in high accuracy.

Further, JP-A-11-91383 has proposed a turning assist apparatus of a vehicle in which differential rotation generating means is provided to generate a differential rotation between the left and right driven wheels so that an outer-wheel-side driven wheel is increased in speed faster than an inner-wheel-side driven wheel on turn, characterized in that the differential rotation generating means is constituted so that it has a driving source to add a torque to the outer-wheel-side driven wheel to increase a speed faster than the inner-wheel-side driven wheel, the driving source is constituted by an electric motor, and a stator and rotor of the electric motor are coupled respectively to one driven wheel and the other driven wheel. An object of the invention is to provide the turning assist apparatus so that a brake force is not applied to the driven wheels as a whole.

Further, JP-A-2004-322793 has proposed a left and right wheel driving apparatus of a vehicle for providing a turning assist of the vehicle by generating a reverse direction torque at a right-side wheel and left-side wheel as an identical magnitude by at least a single electric motor, in which the left and right wheel driving apparatus is characterized by: decelerating command detection means that detects a decelerating command of the vehicle; electric motor adjustment means that makes a torque of the electric motor low when a decelerating command—2Tx is detected as a brake torque in terms of torque at the wheels under condition where the turning assist is being functioned; and brake means that adjusts a frictional brake torque of the left and right wheels so that a difference of a left and right wheel torque becomes 2Ty and the brake torque becomes—2Tx in response to a torque adjustment of the electric motor. An object of the invention is to provide the left and right wheel driving apparatus of the vehicle capable to carrying out the turning assist sufficiently by a small size electric motor when a brake operation is carried out under the turning assist condition. Therefore, a cooperative movement of the electric motor and frictional brake is carried out so that a loss of the electric motor can be reduced, consequently, a fuel consumption of the vehicle can be made good.

DISCLOSURE OF INVENTION

The foregoing three related techniques disclose the inventions to attempt to return a regenerative current of the motor to the battery and to reduce the loss by cooperating the frictional brake and the electric motor. Further, each of the related techniques discloses to extract a power from the battery and supply to the electric motor, but does not disclose to refer a management between the battery and a generator and also between the battery the engine, and part of suggestions to facilitate the left and right wheel driving performance implemented by an electric supply method.

Normally, the battery is charged up by the generator (alternator) driven by the engine. The battery voltage is lowered to increase a duty ratio of a supply current to a field coil of the rotor, so that a power generating operation is carried out to obtain a generator terminal voltage higher than the battery voltage and to flow an electric charge into the battery which is thereby charged up. A power for obtaining the left-right-wheel differential torque is supplied to the motor from the foregoing battery to naturally lower the battery voltage remarkably. For example, the power of several kw is required to generate the left-right wheel-differential torque difference to be exerted to the extent of an effect on the vehicle motion. The voltage is lowered because of supplying the foregoing voltage, and the alternator starts to generate a power for compensating the voltage down, consequently, a load (brake torque) is acted on the engine. Naturally, a large decelerating force is acted on the vehicle body through a drive shaft, therefore, the following problems arise.

1. A deceleration that generates regardless of the acceleration operation by a driver (→uncomfortable feeling).
2. A vertical load of the rear wheel side is lowered by load transfer due to the deceleration, so that an instantaneous cornering power of the rear wheels is lowered. Because of this, a static margin is lowered to increase tendency toward an oversteer. Under this condition, the vehicle is not so good for driving it by the driver.

An object of the invention is to provide a left-right-wheel differential torque generator having correction means so that a deceleration to be acted on a vehicle is made small even when a rotating electric machine is operated for generating a left-right-wheel differential torque. Further, the left-right-wheel differential torque generator provides a reduction of fuel consumption and an increase of the amplitude of left-right-wheel differential torque to be able to generate, so that the vehicle motion performance is enhanced.

In order to achieve the foregoing object, there are two methods for each electric supply method to the rotating electric machine.

1) A case where the power is supplied to the rotating electric machine from either a power generator driven by an engine or a battery charged up by the power generator.

A compensation throttle opening is given to correct a torque of an engine brake amount due to the power supply, in addition to a throttle movement by the driver. Because of this, a deceleration which is not intended by the driver is not generated.

2) A case where the power is supplied to the rotating electric machine from a regenerative brake fitted in wheels.

Two generators 1, 2 coupled independently to each of the left and right wheels are provided, and a rotating electric machine 3 for generating a torsional torque is also provided. The generator 1 then absorbs (brakes) the torque from one wheel to generate a power, and this power is supplied to the rotating electric machine 3 so that it generates the torsional torque in a direction toward which the other wheel (coupled with the generator 2) is accelerated.

The foregoing operation will be described with an example of a case where a counterclockwise yaw moment is required.

First, assuming that a first power generator is fitted in the left wheel, a brake torque is generated at the left wheel by the power generation of first power generator.

The vehicle is subject to the following movement.
1. A decelerating force is generated.
2. The counterclockwise yaw moment is generated.

Next, the power generated by the first rotating electric machine is supplied to a third rotating electric machine so that the right wheel fitted with a second rotating electric machine is accelerated. The vehicle is subject to the following movement.
3. An accelerating force is generated.
4. The counterclockwise yaw moment is generated.

The acceleration and deceleration given to the vehicle becomes zero since the actions of the foregoing item 1 and item 2 are canceled each other if an energy loss and a speed difference between the left and right wheels are neglected. Further, the actions of the items 3 and 4 are reinforced with each other to thereby facilitate a control effect. Furthermore, the foregoing controls do not affect directly on the battery and are operable regardless of the engine load caused by the alternator, therefore, the fuel consumption is not made impaired.

According to the foregoing description, the left-right-wheel differential torque generator is provided with the small deceleration acted on the vehicle body and the remarkable control effect, so that the vehicle motion performance can be improved.

BEST MODE FOR CARRYING OUT THE INVENTION

Hereinafter, a best mode for carrying out the invention will be disclosed with use of the drawings.

Embodiment 1

Figure 1:
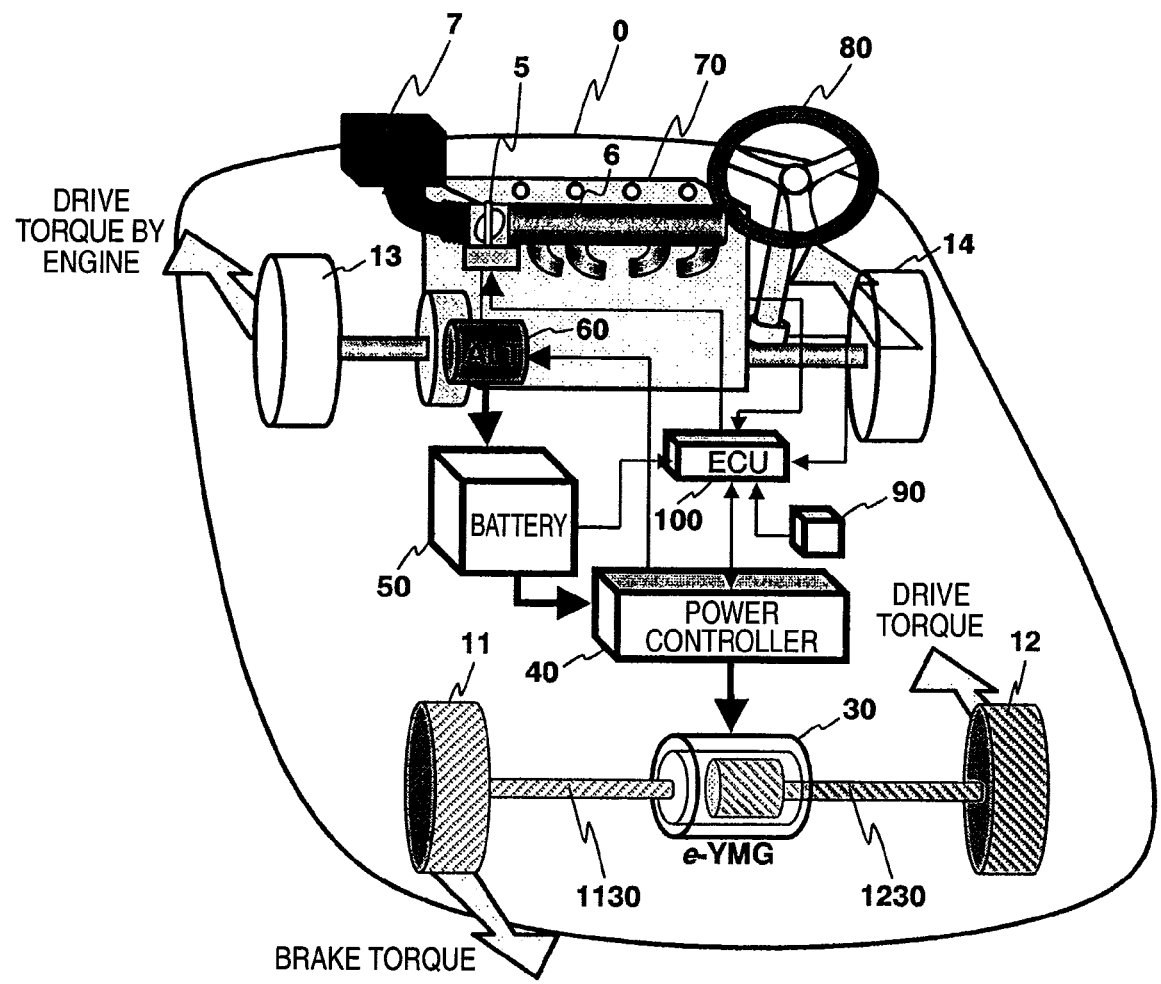
FIG. 1 is a diagram showing an entire constitution in a first embodiment of the invention.

FIG. 1 shows an entire constitution in a first embodiment of the invention. In this embodiment, a vehicle 0 is a front-engine-front drive vehicle (FF vehicle) wherein a left-front wheel 13 and a right-front wheel 14 are driven by an engine 70. An alternator 60 is also driven by the engine 70, and a generated power is charged up into a battery 50.

An air intake system of the engine 70 is constituted by an independent air intake tube and a serge tank 6, an air cleaner 7, and an electronic control throttle 5 connected with the foregoing units. In addition, a supplementarily detailed description of the engine will not be concerned here to avoid complication.

Generally, an engine torque can be adjusted by a revolution speed, an inflow air amount, a fuel injection amount, and an ignition timing. In this embodiment, the inflow air amount is controlled by the electronic control throttle 5 to control the engine torque, as a constitution.

The electronic control throttle 5 has a complex structure as disclosed in the document of Japanese patent No. 3510033, for example. In the case of an in-vehicle throttle valve controller, a stepping amount by an accelerator pedal is taken as an electric signal by a detector (throttle sensor, not shown) as substitute for a conventionally adjusting operation of a throttle opening directly by a driver who steps the accelerator pedal. The electric signal is subject to a predetermined computing processing to then supply to an actuator (motor, not shown), so that the throttle can be controlled to open and close by the actuator.

In this embodiment, a left-rear wheel 11 and a right-rear wheel 12 are trailing wheels. A yaw moment generator 30 is coupled to the left-rear wheel 11 through a left-drive shaft 1130, and also coupled to the right-rear wheel 12 through a right-drive shaft 1230.

A controller (Electric Control Unit) 100 outputs a control command to a power controller 40 on the basis of driving condition signals such as the revolution speed of the engine 70, the inflow air amount and the fuel injection amount; a battery charging condition signal such as a terminal voltage of the battery; signals such as a steering angle by the driver, a steering angular speed and a steering force, obtained from a steering system 80; and sensor information such as a vehicle speed, accelerations in longitudinal and lateral directions, a jerk, a yaw rate, and a sideslip angle, obtained from a motion sensor 90. The motion sensor 90 will not be described in detail here, however, it is possible to estimate an absolute vehicle speed, the sideslip angle amount, etc. by using a directly detected physical quantity such as the acceleration, the yaw rate, etc. Further, the foregoing physical quantity may be detected directly by using a non-contact optical sensor, a radar, etc.

The power controller 40 controls a charge amount moved from the alternator 60 to the battery 50 on the basis of a command from the controller 100, and controls a power supply from the battery 50 to the yaw moment generator 30, as a constitution. Means that detects a charging condition (terminal voltage, temperature, etc.) of the foregoing battery is incorporated in the power controller 40, which may be formed of a system to send the charging condition to the controller 100 in communication, as required.

The yaw moment generator 30 is constituted so that a torsional torque can be generated between the left and right wheels in response to the power supplied from the battery. Details of the constitution will be described later.

For example, when the torsional torque is generated in a direction toward which the left-rear wheel 11 is decelerated and the right-rear wheel 12 is accelerated, a counterclockwise yaw moment is generated at the vehicle 0. For example, when the vehicle 0 turns to the left, a moment for facilitating the turn is generated to thereby enhance drivability. Further, when there is a possibility to spin the vehicle in the clockwise caused by an oversteer since the vehicle turns to the right direction, it is possible to avoid the spin by giving the counterclockwise yaw moment as a restoring yaw moment from the yaw moment generator 30.

Embodiment 2

Figure 2:
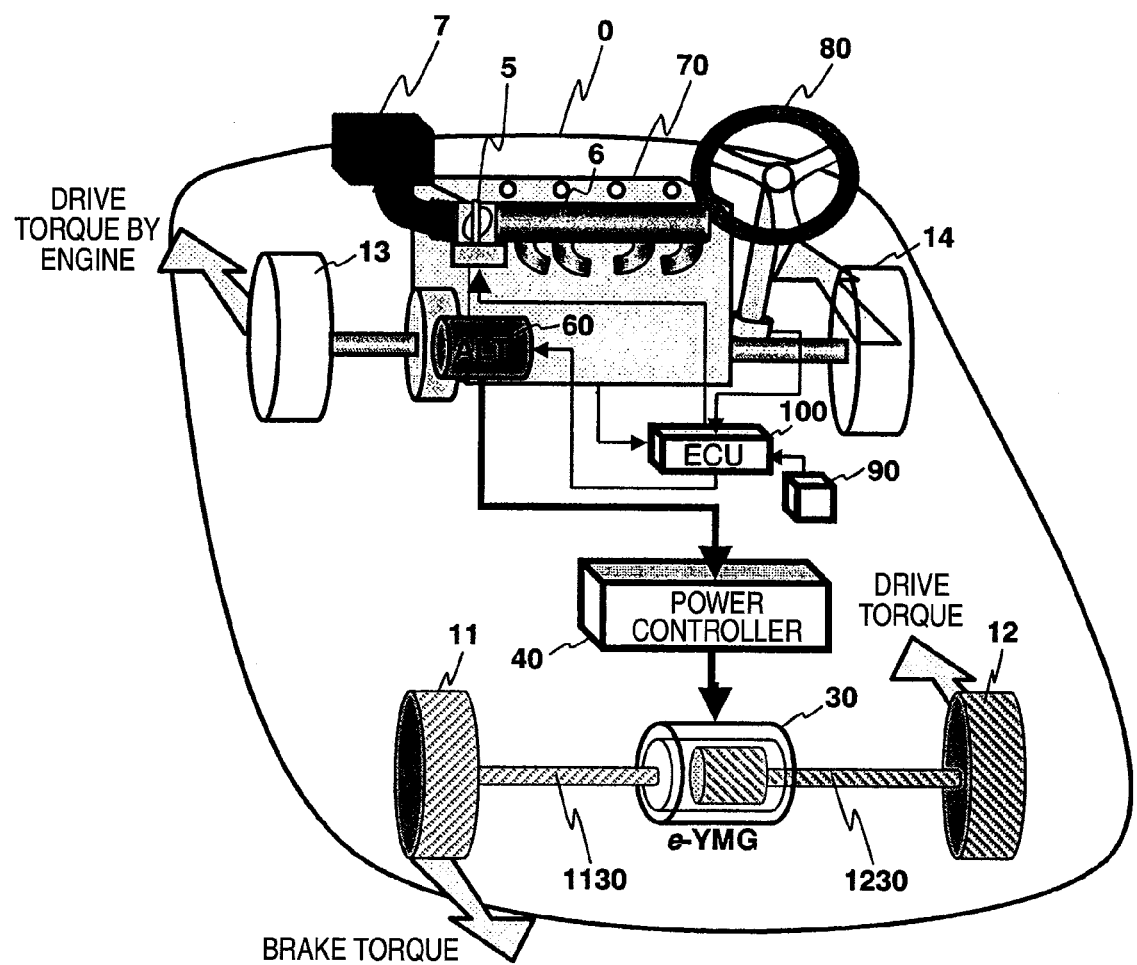
FIG. 2 is a diagram showing an entire constitution in a second embodiment of the invention.

Next, FIG. 2 is a diagram showing a second embodiment omitting the battery 50 in contrast to the first embodiment in FIG. 1. The power generated by the alternator 60 driven by the engine 70 is not charged up into the battery, but supplied to the yaw moment generator 30 without change through the power controller 40, as a constitution. As described above, the second embodiment is only different in that the first embodiment includes the battery, but the both are substantially the same, therefore, a description will be carried on in parallel.

Figure 3:
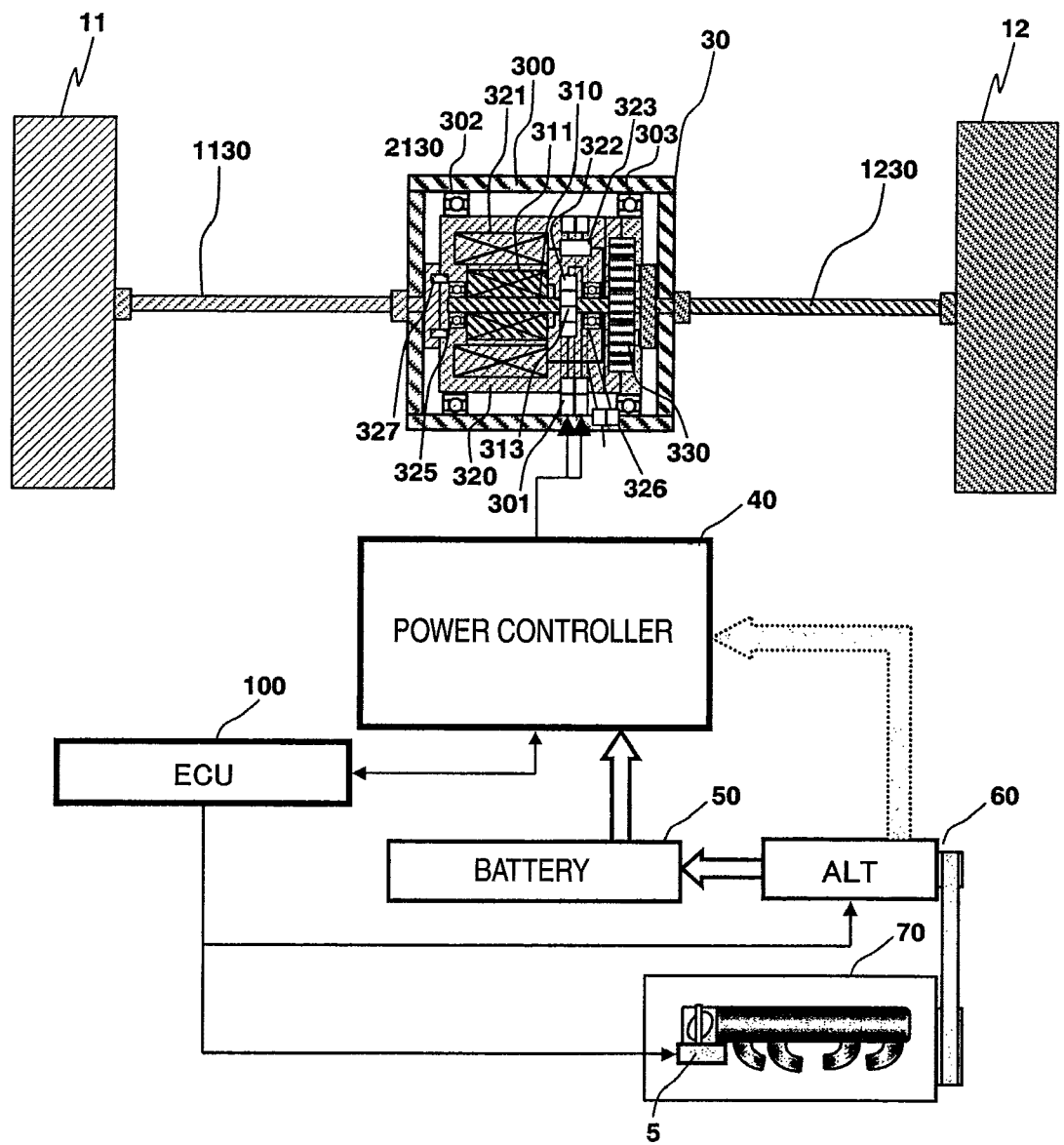
FIG. 3 is a diagram showing a structure and a coupling condition in the first and second embodiments of the invention.

First, the yaw moment generator 30 and its control circuit will be described with use of FIG. 3 and FIG. 4 in detail. In this embodiment, the yaw moment generator 30 is constituted by a coaxial-decelerator-built-in-reciprocal motor (anti-directional twin rotary motor) based on a separately-exited DC motor capable of a field control. Further, the alternator 60 is a rotating field type synchronous generator having a similar constitution of an ordinary in-vehicle alternator.

Here, the reciprocal motor constituting the yaw moment generator 30 will be described briefly to understand it better. Next, a movement and power supply method to the yaw moment generator 30 will be described with a constitution of the power controller 40 and alternator 60.

The reciprocal motor is a motor which extracts both rotational outputs from a stator and a rotor in an ordinary motor ("ADTR-Motor for Electric Vehicle", Kawamura et al., The Transactions of the Institute of Electrical Engineers of Japan D, vol. 115, edition No. 1, 1995). In this embodiment, the reciprocal motor is constituted so that the separately-exited DC motor is placed rotatably in a case which is placed on the vehicle, and its stator side is coupled to the left-wheel and its rotor side is coupled to the right-wheel, as a mechanism. According to the foregoing constitution, the reciprocal motor is synchronized with the rotations of the left-rear wheel 11 and the right-rear wheel 12 so that the motor rotates in one body, when the vehicle 0 is being driven by the engine 70. A relative rotation of the stator and rotor becomes zero in a straight drive condition where there is no speed difference between the left and right wheels. Further, the rotor rotates relatively to the stator to be able to absorb the rotation speed difference when a speed difference is occurred between the left and right wheels in turn. This rotation speed difference is caused by a difference between turning radii of the left and right wheels in either an inner or outer arc when the vehicle turns. In the case of an automobile, the rotation speed difference is about only 20 revolutions per minute throughout ranging over the whole driving range.

On the other hand, the power is supplied to the reciprocal motor to generate a torsional torque between the stator and rotor. Consequently, a torque is generated at one of either the coupled left or right wheel in an accelerating direction, and a torque is generated at the other in a decelerating direction. In the first embodiment of the invention, this torsional torque is utilized as the left-and-right-wheel differential torque which becomes a yaw moment of the entire vehicle.

Here, it should be noted that the torsional torque to be generated by the constitution of the invention has no relation with the vehicle speed. The reciprocal motor rotates itself in response to the vehicle speed, however, there is little or nothing about the relative rotation since the stator rotates substantially together with the rotor. The foregoing torsinal torque has a relation with the relative revolution speed between the stator and rotor. Further, there are the following merits because of a relatively low revolution speed.

A high torque range adjacent to a lock torque is available.
A large deceleration is available (for example, a motor revolution speed is about only 600 revolutions per minute even if a speed reduction ratio is set to 30), and a system can be made small size.
A constitution in a brushed DC motor is available, and low cost can be realized.
An induction back electromotive force is small, and a booster circuit etc. is unnecessary for the power supply, therefore, low cost can be realized.

By utilizing the foregoing merits, the embodiment uses a small size separately-exited DC motor (about 3 kW) and also uses a coaxial-planetary-gear mechanism to thereby employ a system for performing a large deceleration.

Hereinafter, a mechanical structure and method of supplying the power will be described in detail with use of FIG. 4.

The left-rear wheel 11 is coupled to the yaw moment generator 30 through the left drive shaft 1130. The left drive shaft 1130 is coupled, by a captive pin 327, to a field coil holder 320 which is rotatably supported by bearings 302, 303 fitted in a case 300 (a reciprocal motor body or stator is referred to as a field holder to be made clear that the stator side corresponds to the field side of the DC motor). Therefore, the left-rear wheel 11 and left drive shaft 1130 are rotated together with the field coil holder 320 in the yaw moment generator 30. The power supplied from power controller 40 is supplied to the field coil holder 320 through a slip ring 301 in the case 300 fixed on the vehicle body. The two poles are only illustrated in the drawing for a purpose of avoiding complicated illustration, however, the two poles for each of the field side and armature side, that is, four poles can be provided as the slip ring.

The armature is placed rotatably to the field coil holder 320 on which a field coil 321 is fixed through bearings 325, 326. The armature is constituted basically by a rotation shaft 310 on which an armature coil 311 is fixed and a commutator 313 for supplying a current to the armature coil 311, similarly to an armature of the ordinary DC motor.

As described above, the power supplied to the field coil holder 320 through the slip ring 301 is supplied to the field coil 321 supplied through a field control circuit 323 (detail is described later) with a reverse function and a constant voltage function. The power is also supplied to an armature coil 321 through a commutator 323 from a brush 322 fixed on the field coil holder 320. Similarly to the ordinary DC motor, the field coil holder 320 and the rotor are displaced rotatably and relatively each other to switch, in turn, a current direction of the armature coil 311 and to generate a rotating torsional torque with respect to a magnetic field generated by the field coil 321 in accordance with a moment of an electromagnetic force.

Now, the torsional torque generated between the field coil holder 320 (stator) and the armature (rotor) is given to a coaxial decelerator 330 placed on the field coil holder 320 through the rotation shaft 310, and an axial output after deceleration is then coupled to the right drive shaft 1230. As is summarized the description above, the output axis of rotor side of the reciprocal motor in the yaw moment generator 30 is coupled to the right-rear wheel with the deceleration and torque strengthened, as a constitution.

As a result from the description above, the vehicle 0 is driven by the engine 70, and the field coil holder 320 and rotor 310 of the reciprocal motor are rotated together with the left-rear and right-rear wheels 11, 12 when the current is not flown into the part of reciprocal motor. Further, when a turn is carried out under the foregoing condition, the field coil holder 320 and rotor 310 of the reciprocal motor are rotated relatively, and a speed difference between the inner and outer wheels is absorbed so that a smooth turn can be realized. Therefore, there is no change to drive the ordinary front wheel drive vehicle when the current is not flown. On the other hand, the current is flown into the yaw moment generator 30 to generate a torsional torque on the left and right wheels in response to its polarity, consequently, a turning moment is generated around a yaw axis of the vehicle.

The current supply to the yaw moment generator 30 and power controller 40 is carried out through the battery in the first embodiment, and is directly supplied from the alternator 60 in the second embodiment. First, the current supply method will be described in the first embodiment.

In the first embodiment, the alternator 60 is equivalent to the ordinary alternator. A description will be based on a circuit diagram in FIG. 4. There is a feedback loop constituted by an electronic circuit resided between the alternator 60 and battery 50 so that a battery voltage is controlled to be set to a predetermined voltage (normally, 14 V or proximity). A voltage controller so-called an IC regulator (not shown) is incorporated in the alternator to detect the battery voltage equal to an alternator terminal voltage. When this voltage is lower than the predetermined voltage, a current in a field coil 611 of the alternator is increased by a PWM control to increase a magnetic flux to be generated by the field coil 611. A three-phase AC power is generated in an armature coil 612 by the electromagnetic inductive motion. A DC power rectified by a diode bridge circuit 613 in the alternator 60 is either accumulated in the battery 50 or supplied to the yaw moment generator 30 from the power controller 40 connected in parallel with the battery.

Figure 4:
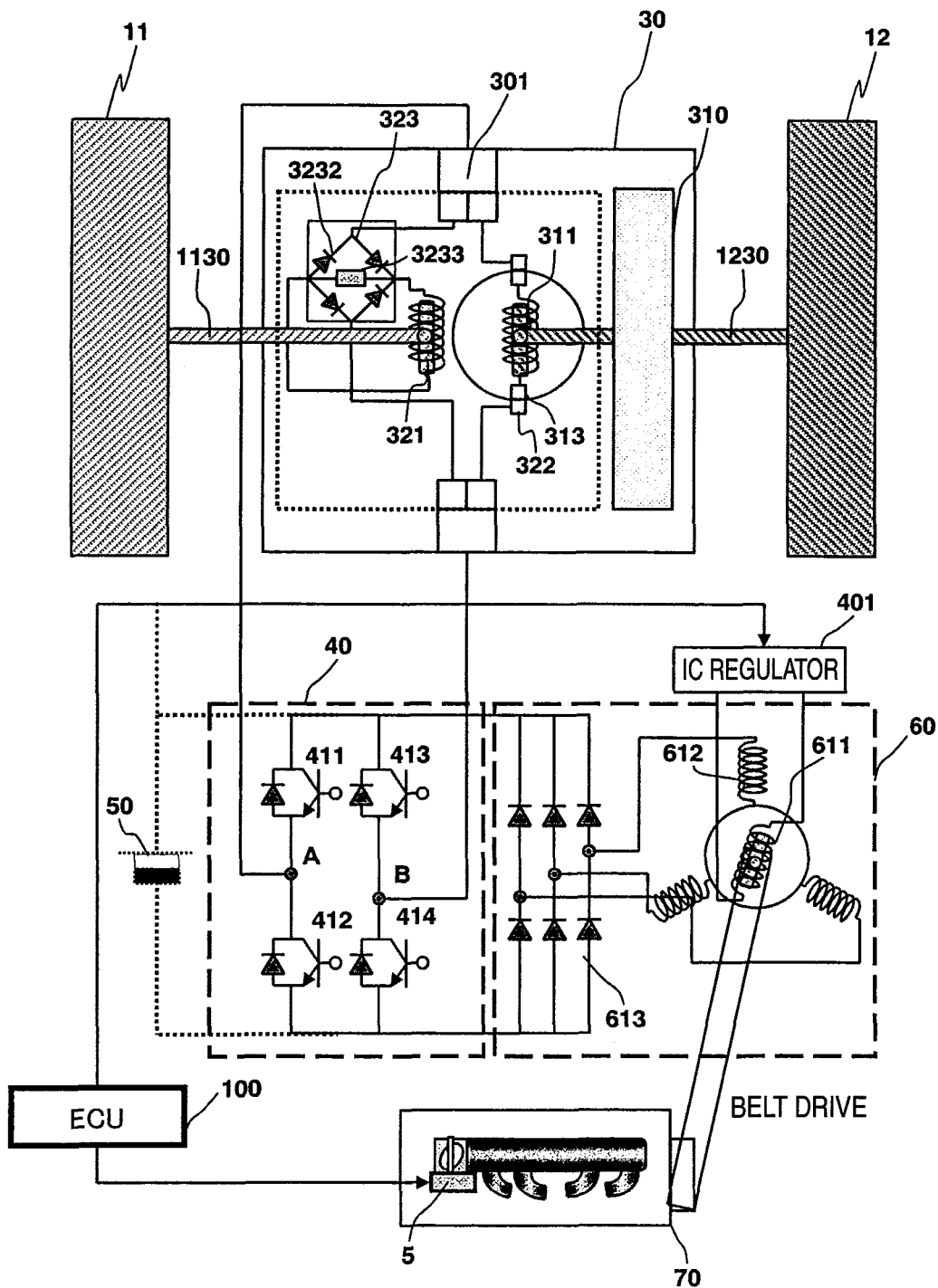
FIG. 4 is a diagram showing an electrical circuit constitution in the first and second embodiments of the invention.

The power controller 40 is constituted by an H bridge as shown in FIG. 4. The vehicle becomes the same condition as the ordinary vehicle so that the battery voltage maintains a predetermined voltage when all of the power transistors in the power controller 40 are off-state. Here, power transistors 411, 414 are turned on so that a voltage at a point A becomes the voltage of battery 50, equal to an output voltage of alternator 60, and a voltage at a point B becomes ground. Therefore, the current is flown into the yaw moment generator 30, and also to the point B. Conversely, power transistors 413, 412 are turned on so that the voltage at the point B becomes the voltage of battery 50, equal to the output voltage of alternator 60, and the voltage at the point A becomes ground. Therefore, the current is flown into the yaw moment generator 30 from the point B and into the point A. That is, the polarity of supplied voltage to the yaw moment generator 30 can be reversed by the H bridge circuit.

Further, it is possible to flow the current of PAM (Pulse Amplitude Modulation) by changing a current duty for the relative power transistors, and it is also possible to regulate an applied voltage.

The yaw moment generator 30 has a constitution of the reciprocal motor, but its structure is the same as that of the separately-exited DC motor. As described above, it is necessary that the torsional torque generated by the yaw moment generator is switched to the left torsion from the right torsion or vice versa. For a purpose of performing such motion, it is necessary that the currents of the armature coil 311 and the field coil 321 are made reversed relatively to invert the direction of magnetic flux interference. For this reason, a diode bridge 3232 is mounted in the field control circuit 323 in this embodiment. This makes a voltage applied from the slip ring 301 invert, enabling the change of the torsional torque direction.

Further, the entire reciprocal motor having the foregoing structure rotates so that a net relative rotation of the field (stator) and armature (rotor) is small, in the embodiment. Therefore, the field current is set to a constant value since a provision for high rotation is not required for such a field weakening control. The field current flown into the field coil 321 by a constant-voltage circuit 3231 becomes a constant value regardless of the voltage applied from the slip ring 301, as a constitution. Consequently, it is possible to control the torsional torque by controlling the armature current alone. Further, the armature current can be controlled directly by the applied voltage from the slip ring 301 since the relative rotation of the field (stator) and armature (rotor) is low, and the back electromotive force is also low.

As is summarized the description above, the torsional torque direction of yaw moment generator 30 can be determined by the polarity of applied voltage, and the torque can be controlled substantially by the applied voltage.

Now, a control command to the yaw moment generator 30 is generated by the controller 100 in response to a steering command from the driver, a vehicle motion condition, an engine running condition, and a battery charging condition.

Mainly, this is a control for the yaw moment, and becomes a torque control command to the yaw moment generator 30.

The power distribution of whether the power is supplied from the battery or from the alternator 60 is dependent on the charging condition, such as the battery voltage. The power is extracted mainly from the battery 50 when the battery voltage is high, and extracted directly from the alternator 60 when it is low. Therefore, a load torque to be absorbed from the engine 70 by the alternator 60 becomes a function of the battery voltage, the applied voltage to the yaw moment generator 30, and the revolution speed for driving the alternator (engine revolution speed×pulley ratio), that is, (Talt=F(Vb, Vy, Ne), where Talt: an alternator load torque, Vb: an battery voltage, Vy: an applied voltage to the yaw moment generator, and Ne: an engine revolution speed. These function relation is stored in the controller 100 as a map in response to Vb, Vy, Ne, or as a simple approximate function in advance, and is set so that an absorbing torque (load) can be predicted for the engine of alternator in response to detecting signals from sensors.

In the case where the predictable load torque is not handled, the torque for driving and accelerating the vehicle 0 is lowered on driving, so that the driver feels an unexpected deceleration and stalling.

Here, since the engine load is predictable, a necessary throttle correction opening substantially equal to the load at every engine revolution speed can be estimated from an engine output map.

As described above, the electronic control throttle 5 takes in an electric signal obtained from a detector detecting the stepping amount of accelerator pedal in replacement of an adjustment operation of the throttle opening directly operated by the accelerator pedal. The electric signal is then subject to a predetermined computing processing to then supply to an actuator, so that the throttle can be controlled to open and close by the actuator. The output torque of the engine 70 can be controlled to be set to an arbitrary value by applying an arbitrary opening command to a part of the computing processing from the controller 100. For example, at before or after the operation of alternator 60, the throttle opening is added so that a torque substantially equal to the torque to be absorbed by the alternator can be generated in addition to the stepping amount of accelerator pedal by the driver. The electronic control throttle is then controlled to obtain a total opening or air amount, so that a deceleration problem caused by the operation of yaw moment generator 30 can be solved.

The battery 50 has been omitted in the second embodiment of the invention. This constitution avoids plural amounts together with the battery used for an ordinary electric load in the case of employing a high voltage alternator to try to obtain high efficiency. In such a case, all the power is supplied to the yaw moment generator 30 from the alternator 60. At this time, the field current control is performed directly from the controller 100 (referring to FIG. 4), which is not the constant-voltage control performed by an ordinary IC regulator. A three-phase power generated in response to the field current is converted to a direct current to be applied to top and bottom arms of the power controller 40. Here, the relative power transistors (411 and 414, 412 and 413) are turned on so that the polarity can be changed, and the applied voltage control can be performed by the switching. On the other hand, the generated voltage can be controlled by controlling the field current of alternator 60, so that the applied voltage to the yaw moment generator 30 can be controlled directly. According to the constitution described above, the power controller 40 does not require to carry out such PAM current control, and may only operate as a voltage polarity switching circuit, so that it is possible to reduce a generation of a switching electromagnetic noise caused by the PAM current flow.

In the case of the second embodiment of the invention without installation of the battery, a degree of freedom of the control can be facilitated as described above. However, there is a possibility to generate a large deceleration since the load torque necessary for a large generation of electricity is absorbed instantly from the engine 70, when the yaw moment generator 30 requests to obtain a large power since there is no buffer such as a battery on the extraction of power. The foregoing deceleration problem caused by the operation of yaw moment generator 30 can be solved by performing the throttle opening correction in the electronic control throttle 5 in accordance with the foregoing procedure. In this regard, the throttle corrected opening increases in comparison with the first embodiment since the correction is performed for the large engine load.

Figure 5:
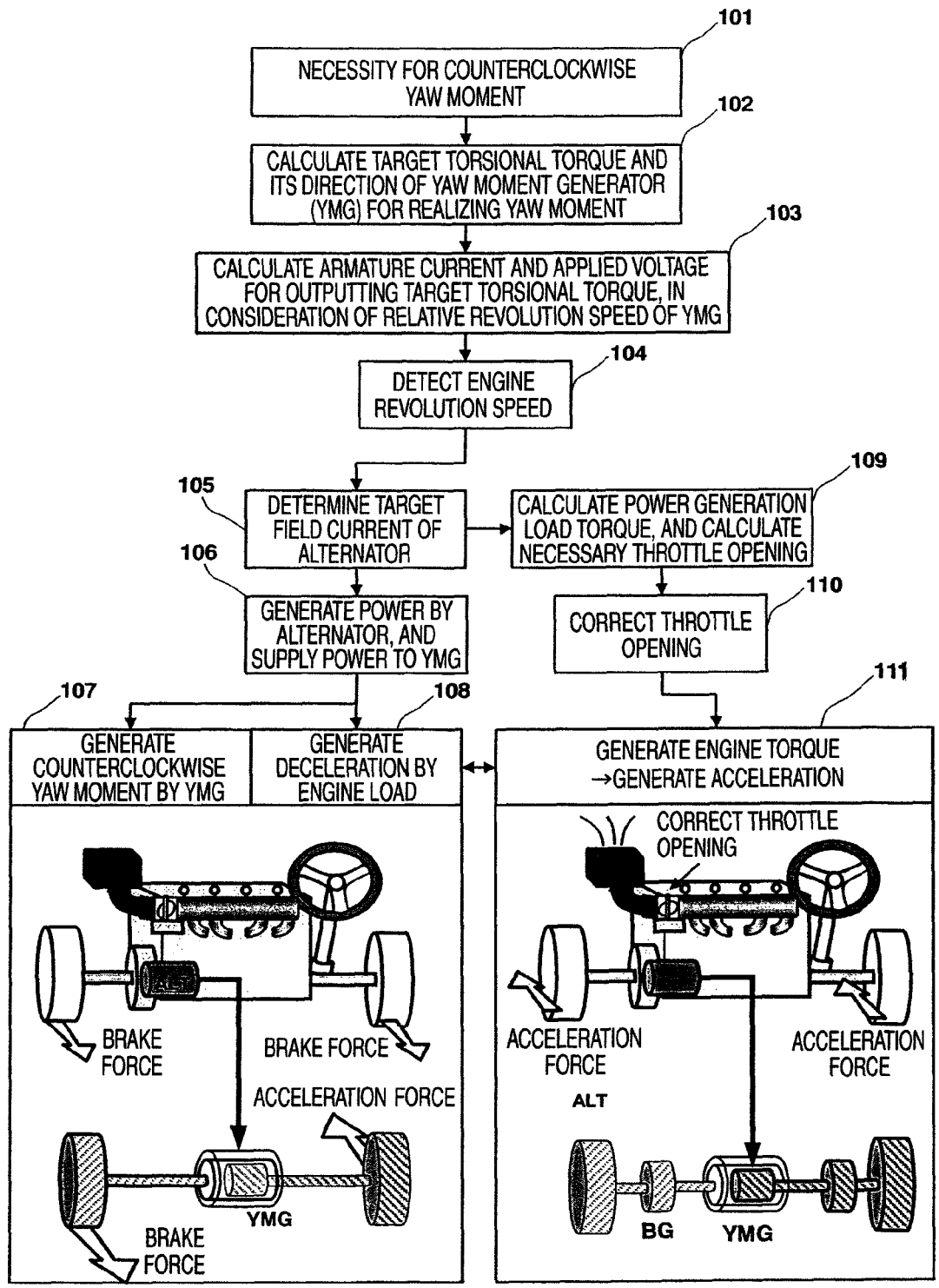
FIG. 5 is a diagram showing a control flow chart in the first and second embodiments of the invention.

Next, a description will be concerned with a control flow with use of FIG. 5 in the case of necessity for a counterclockwise yaw moment. Here, the case of the second embodiment without installation of the battery will be described.

First, at step 101, the controller 100 judges to require the counterclockwise yaw moment in response to the movement condition of the vehicle 0, the drive performance by the driver, etc. At step 102, a magnitude and a direction of a target torsional torque (differential torque) of the yaw moment generator 30 are calculated for realizing the yaw moment. In this case, the right-rear wheel 12 is a direction toward which it is accelerated (direction toward which the counterclockwise moment is given to the vehicle).

Further, at step 103, in consideration of the relative revolution speed to the field (stator) side and armature (rotor) side of the yaw moment generator 30, either an armature current for outputting the target torsional torque, or an applied voltage to the armature coil necessary for realizing the current flow is calculated. The relative revolution speed is small, therefore, it is not considered substantially. In this case, sensor etc. is unnecessary to measure the relative revolution speed of the yaw moment generator 30.

At step 104, the engine revolution speed is detected to thereby detect the revolution speed of the alternator from the pulley ratio. According to the detection, a target field current is calculated for supplying the power calculated at the step 103 (step 105). At step 106, the field current control of the alternator 60 is performed, and a voltage feedback control is performed to obtain the target applied voltage calculated at the step 103. Further, a field current duty control of the alternator 60 may be performed while performing an armature current feedback of the yaw moment generator 30.

The field current of alternator 60 becomes a value proximate to the target field current calculated at the step 105. At the step 106, the power controller 40 further controls the power transistors to supply the current to the yaw moment generator 30 so as to obtain a polarity at which a torsional torque generates in a direction of generating the counterclockwise yaw moment. At step 107, the counterclockwise moment is generated.

Further, at the same time, a brake force acts on the vehicle 0 driven by the engine 70 since a drive torque of the alternator 60 is turned into the engine load to thereby generate the deceleration (step 108).

The target field current is calculated at the step 105, at the same time, the controller 100 calculates a power generation load torque and a necessary throttle opening at step 109.

In this way, at step 110, the opening of electronic throttle 5 is added to the acceleration operation by the driver to correct the opening and to generate a torque substantially equal to the engine load caused by the power generation of alternator 60. Consequently, at step 111, a generated torque by the engine 70 is increased to generate an accelerating force on the vehicle 0. This accelerating force is balanced with the brake force generated at the step 108 to cancel a resultant force occurred in the longitudinal direction, so that the resultant force becomes zero and the deceleration does not act on the vehicle.

Figure 6:
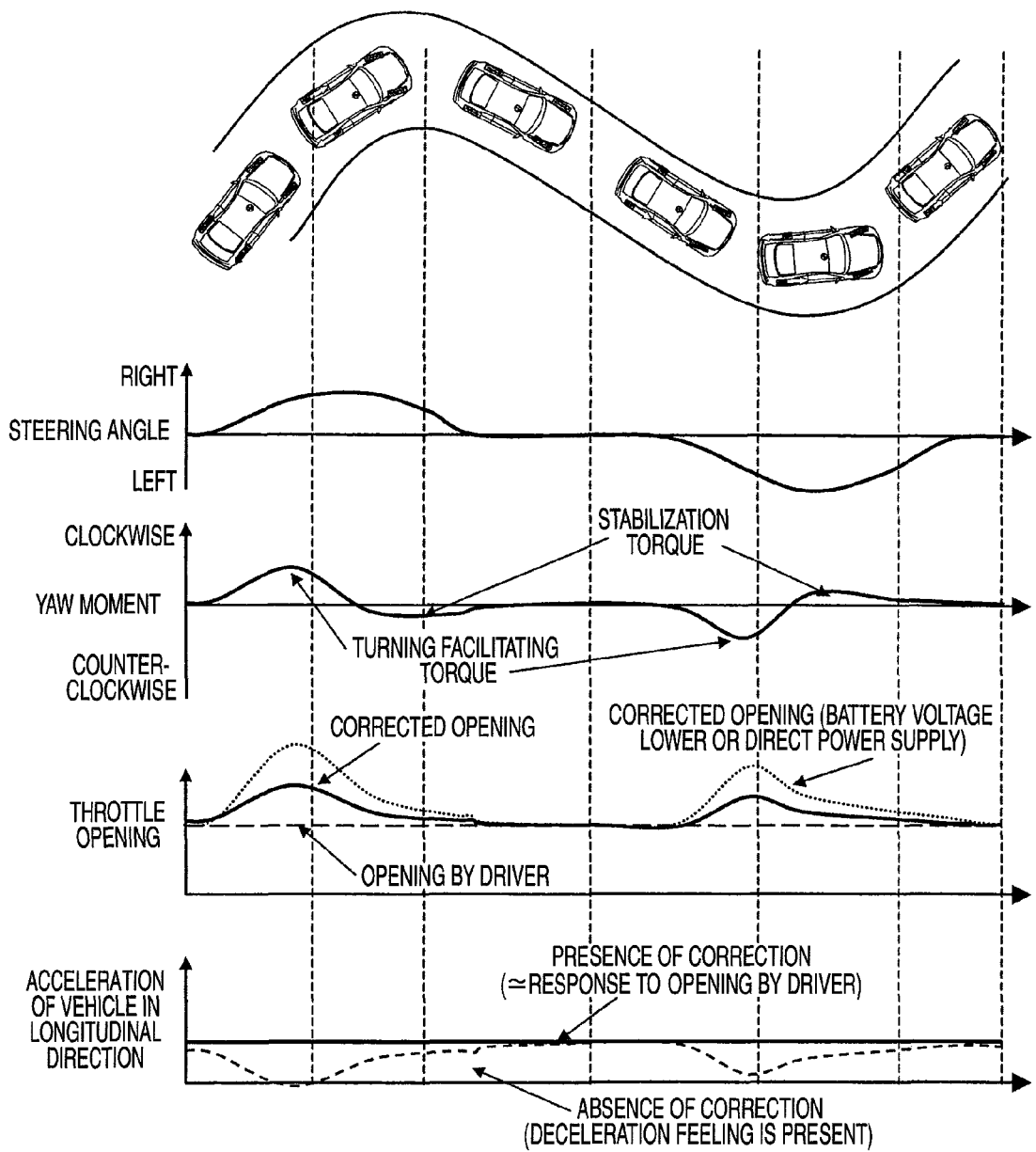
FIG. 6 is a diagram showing a driving condition on "S-shaped road" in the first and second embodiments of the invention.

FIG. 6 is a diagram showing time series information consisting of a steering angle, a yaw moment, a throttle opening, and a longitudinal acceleration of the vehicle, when the vehicle installing with the left-and-right-wheel differential torque generator of the invention drives along an S-shaped curve. For a purpose of avoiding complication, the throttle opening by the driver is made constant in this embodiment. Further, for a purpose of enhancing the drivability of vehicle at a beginning of the turn, it is considered to add a moment in a direction of facilitating the turning, and it is also considered to add a moment in a restoring direction to ensure a stability at a middle of the turn to a later stage thereof. The alternator 60 performs the power generation regardless of either a direction of the torque, and under this condition, the engine load increases. For a purpose of correcting the increase, a throttle opening correction control is performed so that a before-and-after acceleration of the vehicle can be set substantially to a constant (as intended by the driver). In the case of the throttle opening correction shown in the drawing, a condition where the battery voltage is lowered is shown therein, and a condition where the power is supplied directly from the alternator 60 to the yaw moment generator 30 is also shown therein, as described in the second embodiment in FIG. 2. The power is not extracted from the battery 50, therefore, the power generation amount is increased from the alternator 60 itself, the engine load is increased, and a large opening is required for the correction.

As described above, in the case of the vehicle mounting the yaw moment generator 30 between the left and right wheels, for generating the torsional torque in an arbitrary rotational direction, the power to be consumed is predicted for the operation of the yaw moment generator 30 in advance, and the load torque to be absorbed from the engine 70 by the alternator 60 is predicted for supplying the power in the detected engine running condition and the battery charging condition. When the alternator 60 is operated, the throttle opening correction is performed by the electronic control throttle to generate more output substantially equal to the predicted load torque, in addition to the performance at a time of non-operation, so that the deceleration generated at the operation of yaw moment generator 30 can be reduced by adjusting the engine output.

Embodiment 3

Figure 7:
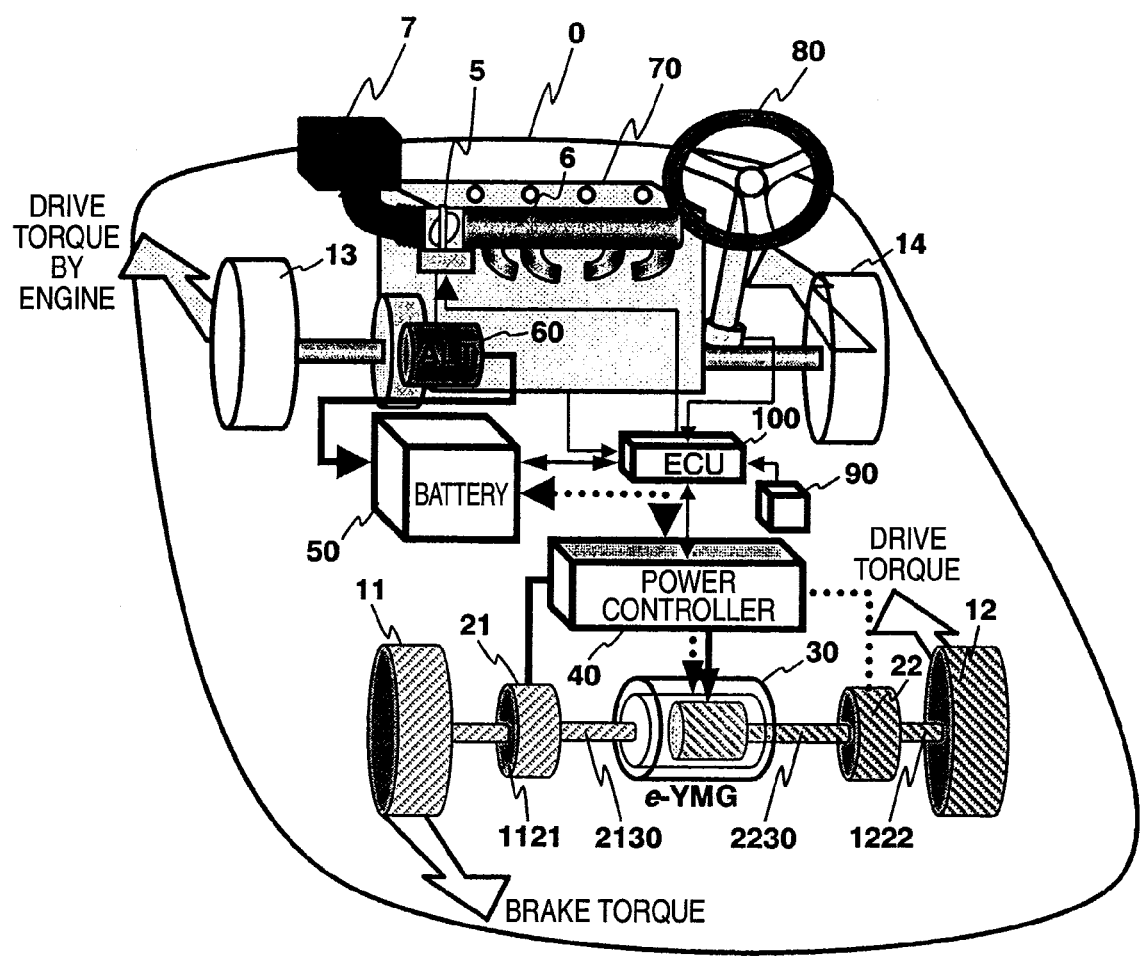
FIG. 7 is a diagram showing an entire constitution in a third embodiment of the invention.

FIG. 7 shows an entire constitution in a third embodiment of the invention. In this embodiment, the vehicle 0 is a front engine front drive vehicle (FF vehicle) driven by the left-front wheel 13 and right-front wheel 14 rotated by the engine 70. The alternator 60 is also driven by the engine 70, and a generated power is charged up into the battery 50.

On the other hand, the left-rear wheel 11 and right-rear wheel 12 are trailing wheels. A left-side brake generator 21 is coupled to the left-rear wheel 11 through a left-outer drive shaft 1121. The left-side brake generator 21 is coupled to the yaw moment generator 30 through a left-inner drive shaft 2130, and the right-side brake generator 21 is coupled to the yaw moment generator 30 through a right-inner drive shaft 2230, similarly to the first and second embodiments.

The controller (Electric Control Unit) 100 outputs a control command to the power controller 40 on the basis of the steering angle by the driver, steering angular speed, steering force, etc. obtained from the steering system 80, and the vehicle speed, accelerations in longitudinal and lateral directions, jerk, yaw rate, and sideslip angle obtained from the motion sensor 90, for example. The motion sensor 90 will not be described in detail here, however, it is possible to estimate an absolute vehicle speed, the sideslip angle amount, etc. by using a directly detected physical quantity such as the acceleration, the yaw rate, etc. Further, the foregoing physical quantity may be detected directly by using a non-contact optical sensor, a radar, etc.

The power controller 40 controls an electric power generation amount of the left-side and right-side brake generators, and a current supply to the yaw moment generator 30, as a constitution.

Figure 8:
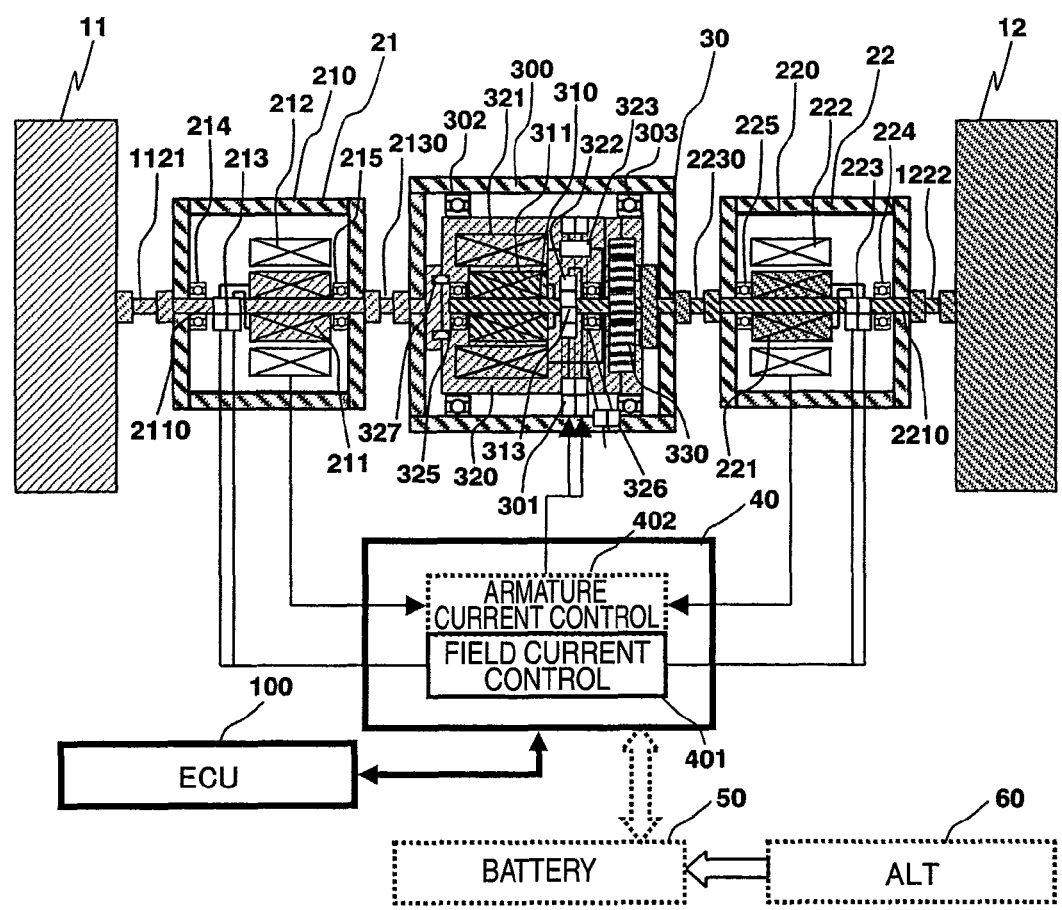
FIG. 8 is a diagram showing a structure and a coupling condition in the third embodiment of the invention.

Next, a description will be concerned with details of the respective left-side and right-side brake generators 21, 22 and yaw moment generator 30 with use of FIG. 8. The respective left-side and right-side brake generators 21, 22 are constituted by a rotational field type synchronous machine equivalent to an ordinary in-vehicle alternator, in this embodiment. The yaw moment generator 30 is constituted by the coaxial-decelerator-built-in-reciprocal motor based on the separately-exited DC motor capable of carrying out the field control.

Cases 210, 220, 300 of the respective the left-side and right-side brake generators 21, 22 and yaw moment generator 30 are fixed on the vehicle 0. Further, rotors to be described below are placed rotatably by bearings therein. Particularly, since the yaw moment generator 30 is constituted as a reciprocal motor, the field coil holder 320 to be normally used as a rotor is also placed rotatably in the case 300. For a purpose of avoiding complication, the drawing shows necessary minimum bearings which support the rotational parts, which is however not limited to the foregoing constitution in the invention. Hereinafter, a mechanical structure and a current supply method will be described in detail.

The left-rear wheel 11 is coupled to a rotation shaft 2110 of the left-side brake generator 21 through the left-outer drive shaft 1121. The rotation shaft 2110 is placed rotatably by bearings 214, 215 in the case 210. A field coil 211 is fixed on the rotation shaft 2110, and a power generated on an armature coil 212 can be controlled by the field current control in accordance with the PWM from a field current control circuit 401 in the power controller 40 through a spring ring 213. A PWM control duty of the field current is increased under condition where the left-rear wheel 11 rotates to thereby increase a magnetic flux generated by the field coil. A brake torque to be intended to decelerate the rear wheels is then generated by the electromagnetic inductive motion obtained from the field coil 211 and armature coil 212, and a three-phase AC power is generated in the armature coil 212. A DC power rectified by an appropriate diode bridge circuit etc. (not shown) is supplied mainly to the yaw moment generator 30 through an armature current control circuit 402 in the power controller 40, and the part of power can be accumulated into the battery 50, as a constitution (FIG. 8 shows dotted lines since the accumulation into the battery 50 is not a primary function).

The left-side rotation shaft 2110 of the left-side brake generator 21 is penetrated into the case 210 to be coupled to a left-inner drive shaft 2130 extended to the yaw moment generator 30. The left-inner drive shaft 2130 is coupled to the field coil holder 320, by the captive pin 327, supported rotatably by the bearings 302, 303 in the case 300 (in this embodiment, the reciprocal motor body, the stator or stator side is referred to as a field holder to make the field side of DC motor clear). Therefore, the left-rear wheel 11 and the left-side rotation shaft 2110 of the left-side brake generator 21 are rotated together with the field coil 211 and the field coil holder 320 of the yaw moment generator 30. The power from the power controller 40 is supplied to the field coil holder 320 through the slip ring 301 in the case 300 fixed on the vehicle body. For a purpose of avoiding complication, the drawing shows two poles alone, however, the two poles may be provided for each of the field and armature sides, that is, the slip ring having four poles may be provided.

The armature is placed rotatably on the field coil holder 320 fixed with the field coil 321 through the bearings 325, 326. The armature is constituted basically by the rotation shaft 310 fixed with the armature coil 311 and the commutator 313 to be supplied a current to the armature coil 311, similarly to the armature of ordinary DC motor.

As described above, the power supplied to the field coil holder 320 through the slip ring 301 is supplied to the field coil 321 through the reversal-mechanism-built-in field control circuit 323 (described in detail later). The power is also supplied to the armature coil 311 through the commutator 313 from the brush 322 fixed on the side of field coil holder 320. Similarly to the ordinary DC motor, the field coil holder 320 and rotor are displaced relatively in rotation to switch, in turn, a current supply direction of the armature coil 311 and to generate a rotation torsional torque by the electromagnetic force motion relative to a magnetic field generated by the field coil 321.

Now, the torsional torque generated between the field coil holder 320 (stator) and armature (rotor) is led to the coaxial decelerator 330 placed on the field coil holder 320 through the rotation shaft 310, and an axial output after deceleration is coupled to the right-inner drive shaft 2230. The right-inner drive shaft 2230 is coupled to the right-rear wheel 12 through the right-side brake generator 22, however, a description of its structure is omitted since it is substantially the same as coupled the left-side brake generator 21 with the left-rear wheel 11. In short, an output axis of the reciprocal motor rotor side of the yaw moment generator 30 is coupled to the right-rear wheel with the deceleration/torque strengthened.

As a result of the description above, the vehicle 0 is driven by the engine 70, and the field coil holder 320 and rotor 310 in the reciprocal motor, the left-side and right-side brake generators, and the left-rear and right-rear wheels, are rotated together with, when the current is not flown in the reciprocal motor. Further, in the case of the turning under the foregoing condition, the field coil holder 320 and rotor 310 in the reciprocal motor are rotated relatively to absorb a speed difference between the inner and outer wheels, enabling a smooth turn. Therefore, the foregoing drive is no change compared with the ordinary front wheel drive vehicle in the case of no current supply. On the other hand, the current is supplied to the yaw moment generator 30 to generate the torsional torque at the left and right wheels in response to its polarity. Consequently, the turning moment is generated around the yawing axis of the vehicle body.

Figure 9:
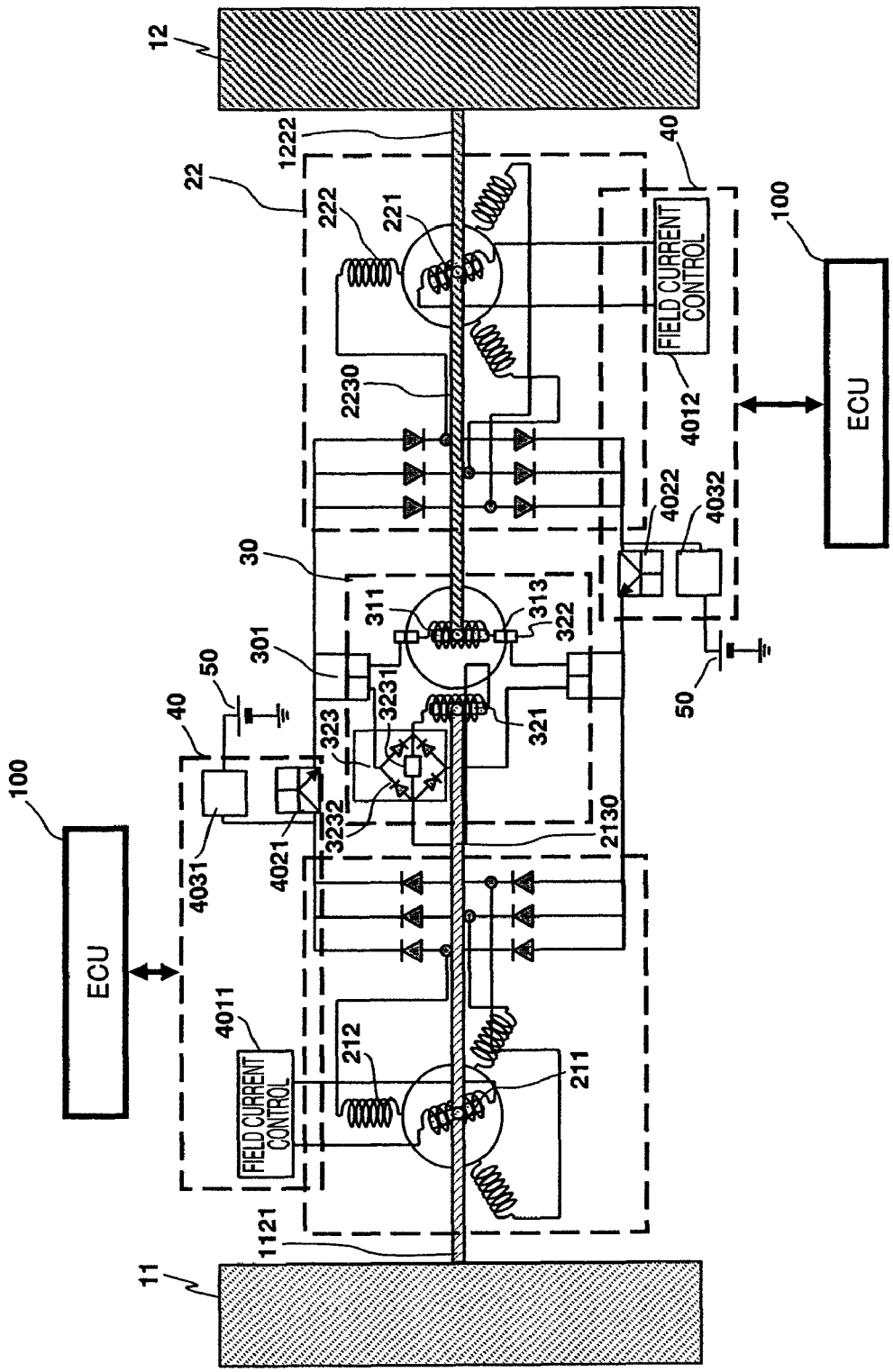
FIG. 9 is a diagram showing an electrical circuit constitution in the third embodiment of the invention.

FIG. 9 is a diagram schematically showing an equivalent circuit of the three rotating electric machines, a power connecting condition, and mechanical couplings in FIG. 8. The left-rear wheel 11, field coil 211 of left-side brake generator 21, and field coil 321 (stator) of yaw moment generator 30, are rotated together with. Further, the axial decelerator 330 is omitted, however, the armature coil 311 (rotor) of yaw moment generator 30, and the field coil 221 and right-rear wheel 12 of the right-side brake generator 22, are rotated synchronously on the basis of a relation of a certain speed reduction ratio. All of the rotation systems are rotated together with, when the field coil 321 and armature coil 311 in the yaw moment generator 30 are not displaced relatively in rotation.

The brake generator 21 (22) is a rotational field type synchronous machine, similarly to the ordinary alternator, and generates a certain strength of a rotor's magnetic flux formed by the field current, a voltage in response to the rotation speed (equal to the rotation speed of left-rear wheel) of the rotor, and a three-phase alternating current having a certain frequency. This three-phase alternating current is converted into a direct current by an ordinary diode rectification bridge circuit. This bridge circuit 216 (226) may be installed either in the left-side brake generator 21 or in the power controller 40. Consequently, the voltage of the DC power can be controlled by the current flown into the field coil 211 (221) under the driving condition where a certain revolution speed of wheels is obtained. In this embodiment, the field current is controlled by the PWM (Pulse Width Modulation) to be able to control a voltage to be generated from the brake generator 21 (22) in response to a duty signal from the power controller 40.

The yaw moment generator 30 is constituted as the reciprocal motor, however, its structure is no change compared with the separately-exited DC motor. As described above, it is necessary to switch the torsional torque generated by the yaw moment generator from the right torsion to the left torsion or vice versa. For this reason, it is necessary to invert a magnetic flux interference direction by relatively inverting the currents of the armature coil 311 and field coil 321. Because of this, a diode bridge 3232 is incorporated in the field control circuit 323 in this embodiment. This inverts the voltage applied from the slip rings 301, so that the torsional torque direction can be changed.

Further, the entire reciprocal motor having the foregoing structure rotates so that a net relative rotation of the field (stator) and armature (rotor) is small, in this embodiment. Therefore, the field current is set to a constant value since a provision for high rotation is not required for such a control of turning the field down. The field current flown into the field coil 321 by the constant-voltage circuit 3231 is set to a constant value regardless of the voltage applied from the slip ring 301, as a constitution. Consequently, it is possible to control the torsional torque by controlling the armature current alone. Further, the armature current control can be performed directly by the applied voltage from the slip ring 301 since the relative rotation of the field (stator) and armature (rotor) is small, and the back electromotive force is also small.

As is summarized the description above, the torsional torque direction of yaw moment generator 30 can be controlled by the polarity of applied voltage, and its torque can be controlled substantially by the applied voltage.

The foregoing electrical characteristic is taken into consideration, a wiring constitution is concerned with the following description in the embodiment.

The wiring is carried out to obtain a voltage polarity so that the left-side brake generator 21 performs the power generation to generate the torsional torque in a direction toward which the yaw moment generator 30 makes the right-rear wheel 12 accelerated. The wiring is also carried out to obtain a voltage polarity so that the right-side brake generator 22 performs the power generation to generated the torsional torque in a direction toward which the yaw moment generator 30 makes the left-rear wheel 11 accelerated.

Further, the voltages generated from the respective brake generators are controlled respectively by field current control circuits 4011, 4012 in response to the command from the controller 100, and the currents supplied to the yaw moment generator 30 are controlled respectively by armature current control circuits 4021, 4022. As described above, the generated torsional torque from the yaw moment generator 30 can be controlled basically by the generated voltages of the brake generators, that is, the field current control circuits 4011, 4012. However, current sensors are provided respectively for the armature current control circuits 4021, 4022, and the field current duty control of the brake generators for each of the wheels may be performed while performing an armature current feedback of the yaw moment generator 30.

Figure 10:
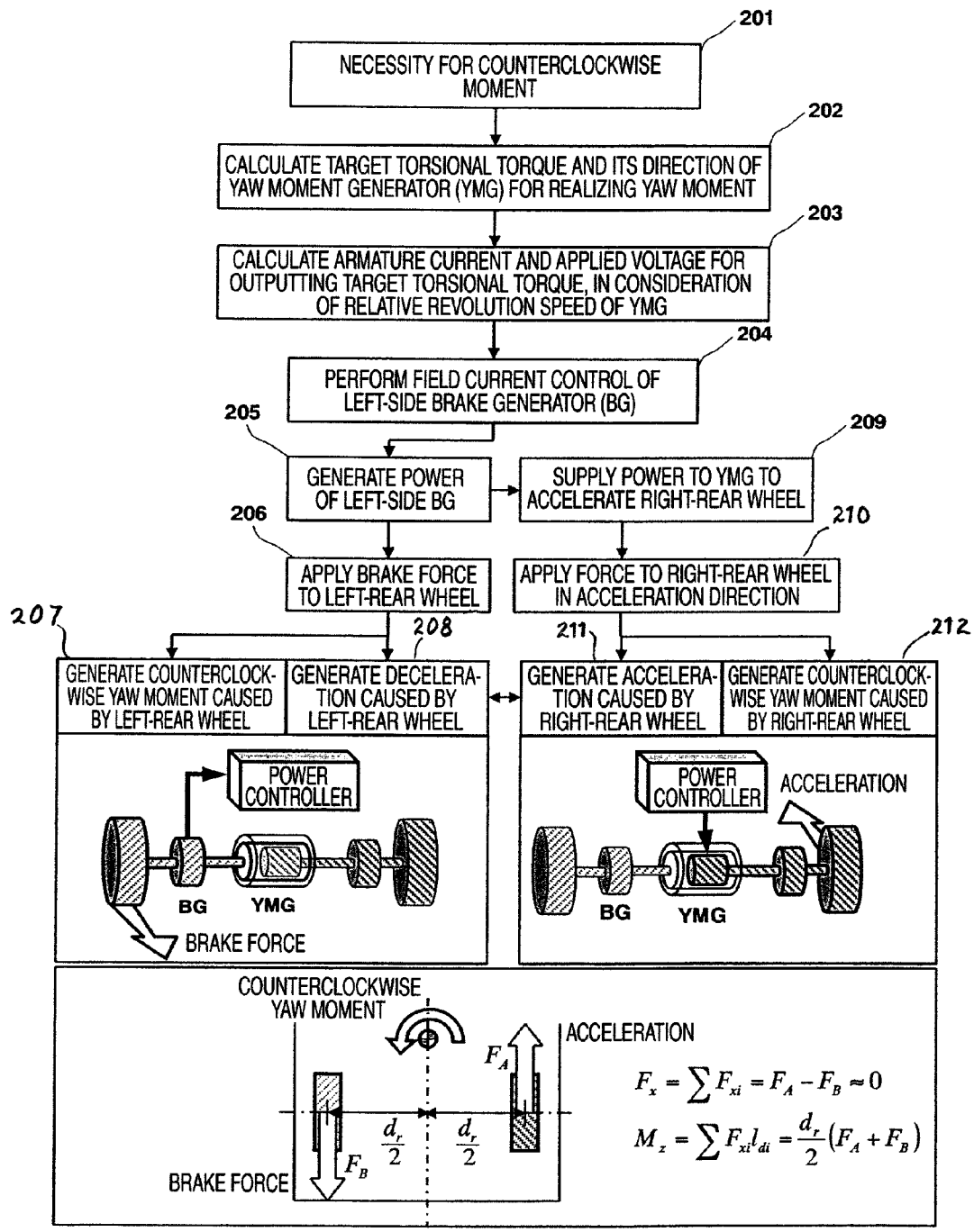
FIG. 10 is a diagram showing a control flow chart in the third embodiment of the invention.

Next, a description will be concerned with a control flow with use of FIG. 10 in the case where the counterclockwise yaw moment is required.

First, at step 201, the controller 100 judges to require the yaw moment in response to the movement condition of the vehicle 0, the drive performance by the driver, etc. At step 202, a magnitude and direction of a target torsional torque (differential torque) of the yaw moment generator 30 are calculated for realizing the yaw moment. In this case, the foregoing direction is a direction toward which the right-rear wheel 12 is accelerated (direction toward which the counterclockwise moment is given to the vehicle).

Further, at step 203, in consideration of the relative revolution speed to the field (stator) side and armature (rotor) side of the yaw moment generator 30, an armature current for outputting the target torsional torque, and an applied voltage to the armature coil necessary for realizing the current flow are calculated. The relative revolution speed is small, therefore, it is not considered substantially. In this case, a sensor etc. is unnecessary to measure the relative revolution speed of the yaw moment generator 30.

A brake force is applied to the left-rear wheel to give the counterclockwise moment to the vehicle body. For this purpose, the field current control is performed for the left-side brake generator 21 at step 204, and the voltage feedback control is performed to obtain the target applied voltage calculated at the step 203. The field current duty control may be performed for the left-side brake generator 21 while performing the armature current feedback for the yaw moment generator 30.

In this way, at step 205, the left-side brake generator 21 starts to generate a power, and the brake force (FB) is acted on the left-rear wheel at step 206. The counterclockwise yaw moment caused by the left-rear wheel is generated on the vehicle 0 (FB×dr/2, where dr is a rear-tread length) (step 207), and the deceleration is generated by causing that the left-rear wheel decelerates (step 208).

The power generated at the step 205 is supplied instantly to the armature coil 311 in the reciprocal motor through the slip rings 301 in accordance with the polarity so as to generate a torque in the yaw moment generator 30 in the direction toward which the right-rear wheel is accelerated, as indicated at step 209. Further, a constant current is supplied to the field coil 321 of the rotor side from the constant-voltage circuit 3231. In this way, at step 210, a force (torque) FA in the direction toward which the right-rear wheel 12 is accelerated is generated in the yaw moment generator 30, and, at step 211, an acceleration caused by the right-rear wheel 12 is generated on the vehicle body. Further, the counterclockwise yaw moment caused by the left-rear wheel is also generated (FA×dr/2) (step 212).

Here, it should be paid attention that the resultant force occurred in the longitudinal direction is canceled to be turned into zero so that the deceleration is not acted on the vehicle body (the deceleration at the step 208 is canceled with the acceleration at the step 211) as shown in FIG. 4 if the field current of the left-side brake generator 21 is controlled so that the brake force FB at the step 206 is substantially equal to the acceleration force FA at the step 210. Needless to say, the operation of the power generation and current supply is no relation with the engine output, and there is little or nothing about an output from the battery. Therefore, there is no increase of the fuel consumption caused by the control since the engine load does not increase.

Eventually, the yaw moment to be able to act on the vehicle body becomes (FB×dr/2) at the step 207 and (FA×dr/2) at the step 212 to thereby obtain FB×dr, if FA≃FB is given. This meaning described above is that the stronger the brake generator is acted on, the larger the torque at the acceleration side of the yaw moment generator is increased, regardless of the fuel consumption, consequently, a large yaw moment can be obtained.

Further, the power controller 40 also provides bidirectional bypass control circuits 4031, 4032 in relation to the batteries 50 as shown in FIG. 9. This constitution is considered to realize a collateral function to be able to obtain from the following descriptive device constitution of the invention.

① The deceleration assist is only performed by the brake generators 21, 22 in addition to the mechanical brake when a relatively large deceleration is required in response to judgment obtained from the vehicle motion condition and drive performance (a current supply is not performed to the yaw moment generator 30). At this time, the motions similar to the steps 205 to 208 in FIG. 10 are generated at the left and right wheels, a sum of the deceleration forces are contributed to the deceleration of the vehicle, and a value obtained from multiplying a difference of the deceleration forces by the rear-tread length (dr) becomes the yaw moment applied to the vehicle body. In this way, on sudden braking, it is possible to react to and reduce the wobble of vehicle caused by lowering a stability factor in the case where the vertical load at the rear is lowered by moving the load to the front. For this reason, it is necessary that the generated power can be charged up into the battery, as a constitution. This makes a kinetic energy consumed as heat energy by the ordinary brakes to regenerate a brake force, enabling the enhancement of fuel consumption.

② In the case where the respective wheel brake generators cannot generate a sufficient power due to the low speed, the power is extracted conversely from the battery 50. It is possible to supply an appropriate power to the yaw moment generator.

Further, as described the embodiment in FIG. 10, the control is made proximate to obtain the drive force (FA)=deceleration force (FB), however, the following control can also be made. Generally, the power generated from the brake generator can be calculated briefly from a revolution speed×an absorbing torque. As described the first embodiment of the invention above, the relative revolution speed of the field (stator) side and the armature (rotor) side is low in the case where the yaw moment generator 30 is realized by the reciprocal motor. Therefore, a large torque can be extracted since the supply power is obtained from supply power=relative revolution speed×torque. Furthermore, in the case of the first embodiment of the invention, it is possible to set the drive force (FA)>deceleration force (FB) since the coaxial decelerator 330 capable of making a large deceleration is installed in the yaw moment generator. Naturally, it is also possible to control under the drive force (FA)<deceleration force (FB). These options may be controlled on the basis of the drive performance inputs from the driver, such as the movement condition of the vehicle 0 detected by the motion sensor 90, steering input from the steering 80 etc., brake input, accelerator input, etc.

Embodiment 4

Figure 11:
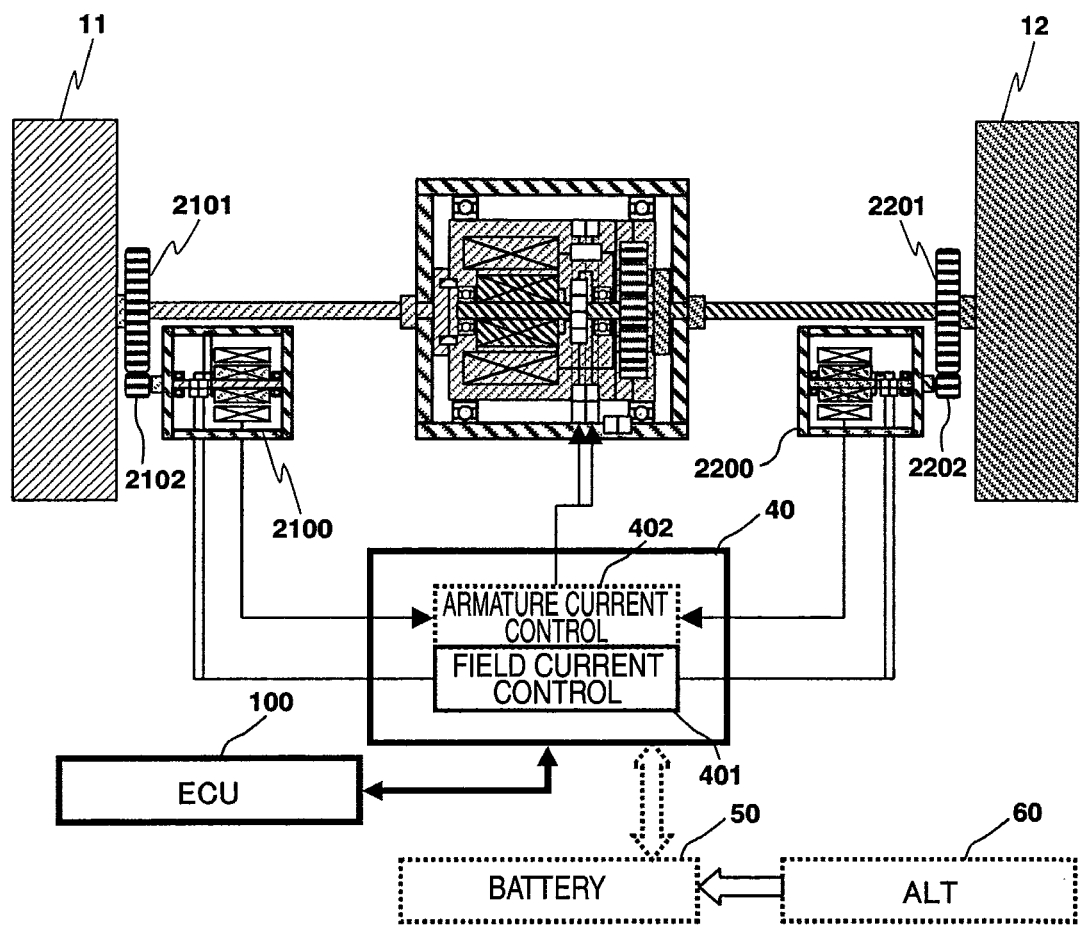
FIG. 11 is a diagram showing a structure and a coupling condition in a fourth embodiment of the invention.

FIG. 11 is a diagram showing a fourth embodiment of the invention. As described above, the electric power generation efficiency of the left-side and right-side brake generators is lowered in a condition where the speed of vehicle 0, the rear wheels of which are rotated in a low speed, is low. Under this condition, the power cannot be ensured to generate the torsinal torque necessary for the yaw moment generator, consequently, it is necessary to extract the power from the battery 50. Naturally, the extracted amount must be corrected by the alternator 60 driven by the engine 70, which causes a deceleration feeling or degradation of the fuel consumption. In the case of the fourth embodiment of the invention, speed-up gears consisting of a gear series 2101, 2102 and 2201, 2202 are coupled respectively to a left-side brake generator 2100 and a right-side brake generator 2200, as a constitution (yaw moment generator is the same as that in the third embodiment). In this way, the power generation efficiency is enhanced in a low speed range to be able to reduce the extraction from the battery 50 and facilitate a small size of the brake generator. For this reason, the installability of the brake generators can be enhanced. For example, the brake generator can be installed on proximity of the wheel (in-wheel) and on a hub-carrier, and there is also a possibility to install it.

Embodiment 5

Figure 12:
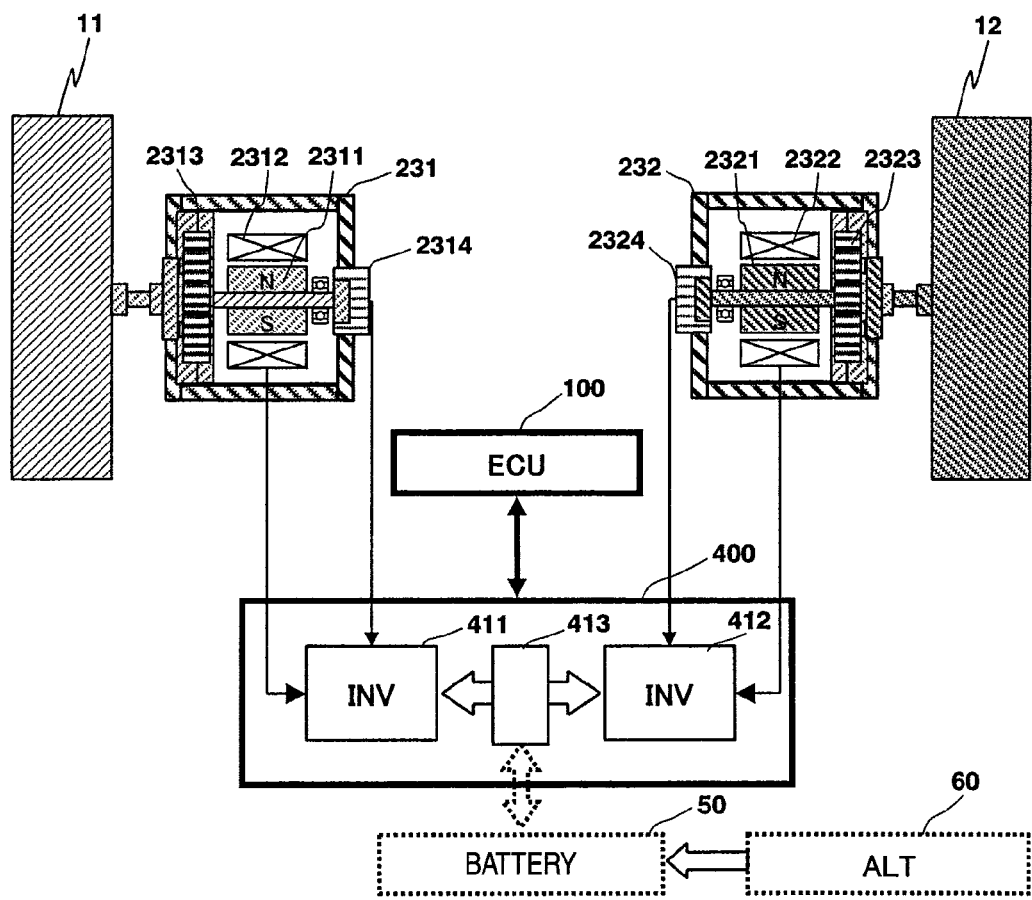
FIG. 12 is a diagram showing a structure and a coupling condition in a fifth embodiment of the invention.
Figure 13:
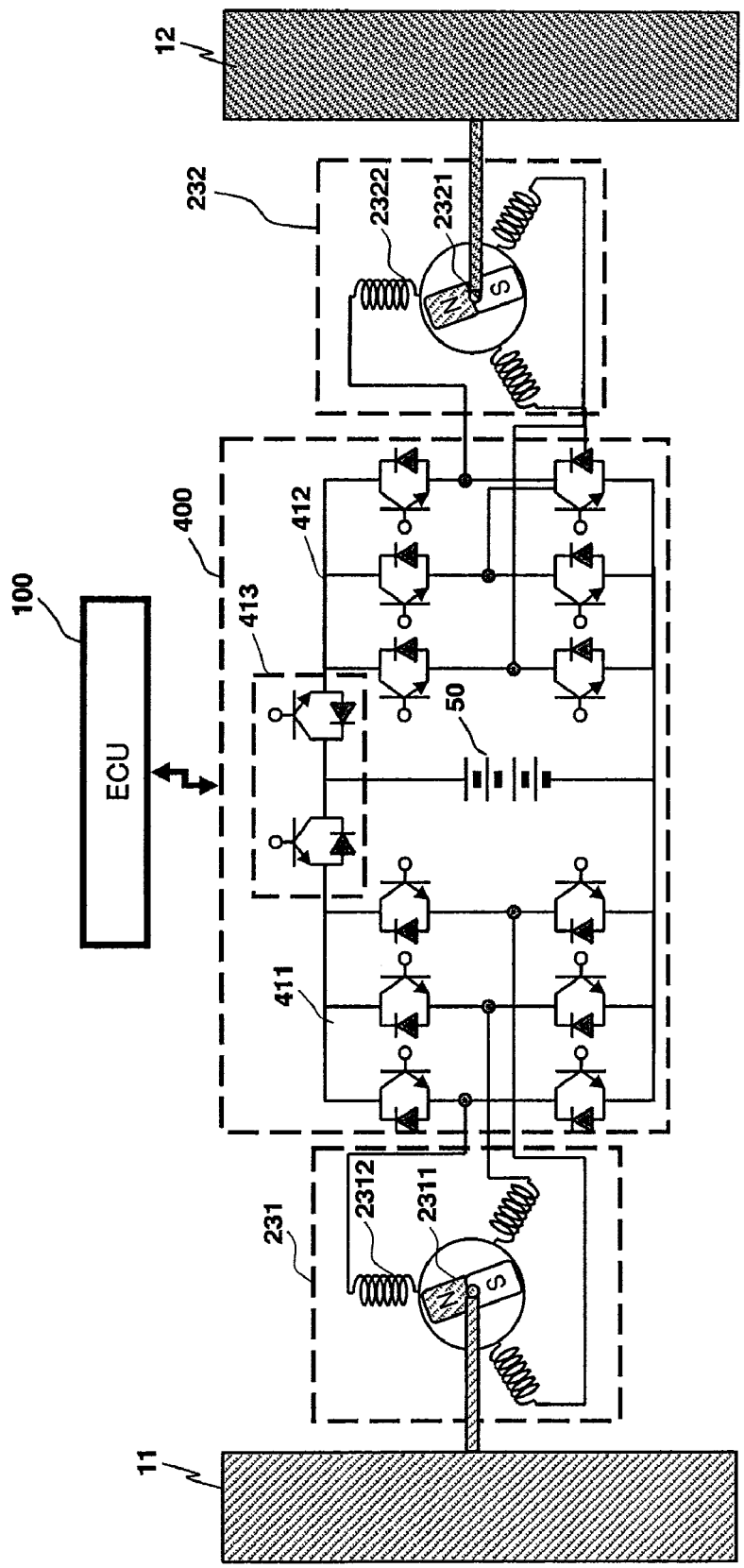
FIG. 13 is a diagram showing an electrical circuit constitution in the fifth embodiment of the invention.

FIG. 12 is a diagram showing a fifth embodiment of the invention. FIG. 13 is a diagram showing a schematic circuit constitution of the fifth embodiment of the invention.

There is no constitution having the left-side and right-side brake generators as described so far, but the functions of generating the power (generation of deceleration torque) and acceleration torque are realized by two motor generators 231, 232.

A left-side motor generator is a decelerator-built-in PM (Permanent Magnet) type motor having a coaxial decelerator 2313. The rotor is constituted by a permanent magnet, and receives the three-phase alternating current by an inverter 411 in response to a magnetic pole position obtained from an encoder 2314. As shown in FIG. 13, the inverter 411 includes a power transistor in parallel with a bridge circuit equivalent to that for rectifying an alternating current generated by the brake generator described in the third and fourth embodiment. In this way, it is possible to realize a regenerative bake as well as the brake generator, and the power is extracted as a DC power. A switching circuit in the power controller 400 switches whether the DC power is charged up into the battery or supplied to the motor generator of an opposite side (right side in this case).

A right-side motor generator generates a power to supply a deceleration torque to the left-rear wheel and to apply a torque in the drive direction to the right-rear wheel, so that the yaw moment control can be made without the deceleration, similarly to the third and fourth embodiments.

There are the following merit and demerit in the case of the third embodiment.
<Merit>
① The left- and right-side motor generators are functioned as motors simultaneously by the power extracted from the battery to be able to drive individually as an electric car.
<Demerit>
① The motor revolution speed increases naturally according to the vehicle speed. The left and right motors become a large size for a purpose of generating a large torsional torque at high revolution speed.

② With high revolution speed, a difficulty level caused by the back electromotive force generated from the high rotation becomes high even in relation to the power transition in the left and right wheels.

③ Two units for each of the encoder and inverter are required, so that the torque control becomes complicated.

According to such merit and demerits, the third, fourth or fifth embodiment may be selected.

Figure 14:
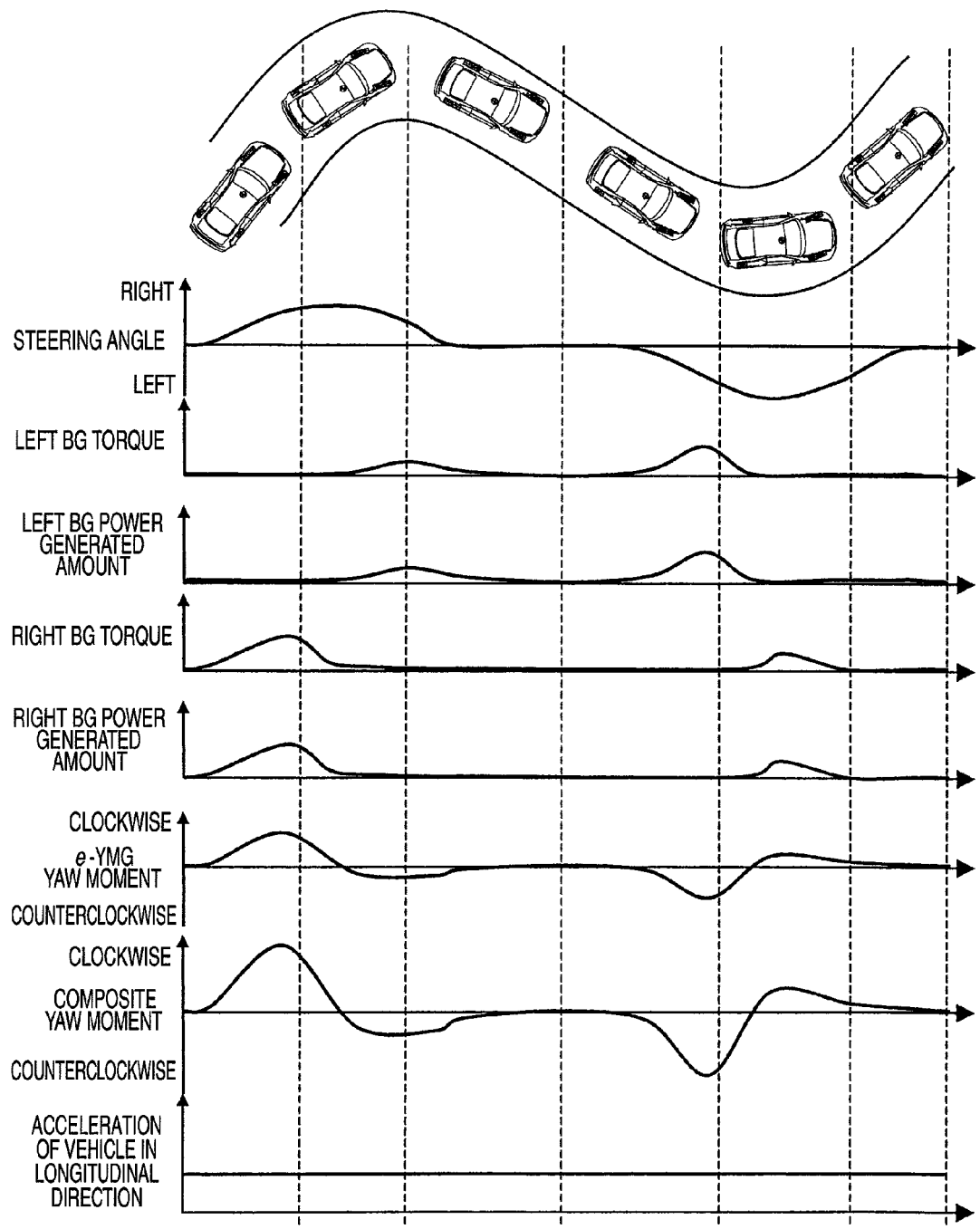
FIG. 14 is a diagram showing a driving condition on "S-shaped road" in the third, fourth and fifth embodiments of the invention.

FIG. 14 is a schematic diagram showing time series information of the steering angle, brake torques of the left-side and right-side brake generators, power generated amount, yaw moment generated by the yaw moment generator, composite yaw moment to be acted on the vehicle body, and a before-and-after acceleration of the vehicle, in the case where the vehicle mounting with the left-and-right-wheel differential torque generator described in the third, fourth or fifth embodiment, drives on the S-shaped curve. For a purpose of avoiding complication, the throttle opening by the driver is substantially constant in this example. Further, for a purpose of enhancing the drivability of vehicle at a beginning of the turn, similarly to the first and second embodiments, it is considered to add a moment in a direction of facilitating the turning/turning around, and it is also considered to add a moment in a restoring direction to ensure a stability at a middle of the turn to a later stage.

For example, at the beginning of right turn, the field current is supplied to the right-side brake generator 22 of the rear-inner wheel side (right-rear wheel) to add a torque in the decelerating direction to the right-rear wheel. This is effective as a yaw moment for facilitating the clockwise turn against the vehicle 0, even a single unit. At the same time, the right-side brake generator 22 starts to generate the power to be supplied to the yaw moment generator 30 through the power controller 40. In this way, a torque is generated in a direction toward which the rear-outer wheel (left-rear wheel 11) is accelerated to make the decelerating torque caused by the right brake generator 22 to be corrected in small, and becomes the clockwise yaw moment for facilitating the turn by the vehicle 0. Therefore, the generation of yaw on the vehicle is made hasty, and the drivability is enhanced.

Further, at the middle to later stage in the right turn, the field current is flown into the left-side brake generator 21 of the rear-outer wheel (left-rear wheel) to add a torque to the left-rear wheel in the decelerating direction. This is effective as a restoring yaw moment of the counterclockwise against the vehicle 0, even a single unit. At the same time, the left-side brake generator 22 starts to generate the power to be supplied to the yaw moment generator 30 through the power controller 40. In this way, a torque is generated in a direction toward which the rear-inner wheel (right-rear wheel 12) is accelerated to make the deceleration torque caused by the left-side brake generator 21 to be corrected in small, and becomes the counterclockwise yaw moment which becomes the restoring yaw moment. Therefore, the vehicle can turn while it maintains high stability.

The foregoing functions extract directly the kinetic energy of vehicle from the rear wheels as driven wheels to convert it to the electric energy and to again distribute as the mechanical energy, which is controllable regardless of the engine driving force. Therefore, deterioration for the acceleration caused by increasing the engine load does not generate theoretically. According to the foregoing description, the left-and-right-wheel differential torque generator has a rotating electric machine between the left and right wheels to generate the torsional torque in an arbitrary rotating direction, so that the before-and-after deceleration of the vehicle caused by the power consumption of the rotating electric machine can be made to be corrected in small.

Further, the yaw moment control may be performed by the brake generator alone, in the case of the turn while the vehicle is decelerated. At this time, the power is regenerated in the battery.

In the invention, the foregoing description indicates mainly examples of the yaw moment generator installed on the rear wheels of the front wheel drive vehicle, however, the yaw moment generator can also be installed on the front wheels of the rear wheel drive vehicle to thereby obtain the same foregoing effect as yaw moment to be acted on the vehicle, so that a quick response and a stability are enhanced to provide a maneuverable vehicle driven by the driver. Further, the rotating electric machines are not limited by the foregoing constitution.

The invention claimed is:

1. A right-and-left-wheel differential torque generator mounting with a rotating electric machine between a left wheel and a right wheel to generate a torsional torque in an arbitrary rotating direction, comprising:
a deceleration compensation device that makes a deceleration in a longitudinal direction of a vehicle to be corrected in small, caused by a power consumption of the rotating electric machine.

2. The generator according to claim 1, wherein the vehicle is driven by an engine at least,
the rotating electric machine is driven by a power supplied from a power generator driven by the engine, and from a battery charged up by the power generator, and,
the deceleration compensation device includes means that predicts, in advance, a power to be consumed in an operation of the rotating electric machine, means that detects an engine running condition, means that detects a charging condition of the battery, and means that predicts a mechanical load to be absorbed from the engine by the power generator, when an amount of the predicted power predicted by the predicting means is supplied under the engine running condition detected by the detecting means and the charging condition of the battery, and
the generator further includes means that adjusts an engine output such that an output substantially equal to the predicted mechanical load is generated more at a time when the rotating electric machine begins to operate, in addition to when the rotating electric machine is non-operated.

3. The generator according to claim 1, wherein the vehicle is driven by an engine at least,
the rotating electric machine is driven by a power supplied from a power generator driven by the engine, and
the deceleration compensation device includes means that predicts a power, in advance, to be consumed in an operation of the rotating electric machine, means that detects an engine running condition, and means that predicts a mechanical load to be absorbed from the engine by the power generator, when an amount of the predicted power predicted by the predicting means is supplied under the engine running condition detected by the detecting means,
thereby, an engine output is adjusted such that an output substantially equal to the predicted mechanical load is generated more at a time when the rotating electric machine begins to operate, in addition to when the rotating electric machine is non-operated.

4. The generator according to claim 2, wherein deceleration compensation device includes a throttle opening adjustment device fitted on the engine to add an arbitrary opening, in addition to a throttle opening operated by a driver.

5. The generator according to claim 1, wherein the rotating electric machine is constituted by a first rotating electric machine, rotors of which are coupled respectively to rotation axes of a left wheel and a right wheel to generate a torsional torque in an arbitrary rotating direction, and stators of which are fixed respectively on a vehicle body,
the deceleration compensation device is constituted by a second rotating electric machine and a third rotating electric machine to be able to generate independently a deceleration side torque on the left and right wheels caused by a power generating operation, and
a power obtained from a power generating operation by the second rotating electric machine is supplied to the first rotating electric machine such that an acceleration side torsional torque is generated on the wheel fixed with a rotor of the third rotating electric machine, and a power obtained from a power generating operation by the third rotating electric machine is supplied to the first rotating electric machine such that the acceleration side torsional torque is generated on the wheel fixed with a rotor of the second rotating electric machine.

6. The generator according to claim 1, wherein the rotating electric machine is a reciprocal motor, an outer rotor and an inner rotor of which are independent each other and placed rotatably by bearings, and is constituted by the outer rotor coupled to one non-driven wheel, and the inner rotor coupled to the other non-driven wheel.

7. The generator according to claim 3, wherein the power generator includes a field coil and an armature coil, and a torsional torque to be generated by the rotating electric machine is controlled such that a generated voltage of the power generator is controlled by a current flown into the field coil of the power generator.

8. The generator according to claim 5, wherein the second and third rotating electric machines are power generators each having a field coil and an armature coil, and
a generated voltage of either the second or third power generator is controlled by a current flown into a field coil of either the second or third power generator to control the torsional torque generated by the first dynamic-electric machine.

9. The generator according to claim 5, wherein the second and third rotating electric machines are coupled to a wheel axis through a speed-up gear.

10. The generator according to claim 1, wherein the rotating electric machine includes two motor generators coupled respectively to left and right wheels to generate a deceleration side torque by a power generating operation and to generate an acceleration side torque by a motor operation,
the deceleration compensation device supplies a power obtained from a deceleration power generating operation by the motor generator coupled to the left wheel such that the motor generator coupled to the right wheel generates a torsional torque in an accelerating direction, and supplies a power obtained from the deceleration power generating operation by the motor generator coupled to the right wheel such that the motor generator coupled to the left wheel generates the torsional torque in the accelerating direction.

11. The generator according to claim 3, wherein the deceleration compensation device includes a throttle opening adjustment device fitted on the engine to add an arbitrary opening, in addition to a throttle opening operated by a driver.

12. The generator according to claim 4, wherein the power generator includes a field coil and an armature coil, and a torsional torque to be generated by the rotating electric machine is controlled such that a generated voltage of the power generator is controlled by a current flown into the field coil of the power generator.

13. The generator according to claim 6, wherein the power generator includes a field coil and an armature coil, and a torsional torque to be generated by the rotating electric machine is controlled such that a generated voltage of the power generator is controlled by a current flown into the field coil of the power generator.

14. The generator according to claim 8, wherein the second and third rotating electric machines are coupled to a wheel axis through a speed-up gear.

* * * * *